US010313768B2

(12) United States Patent
Yang et al.

(10) Patent No.: US 10,313,768 B2
(45) Date of Patent: Jun. 4, 2019

(54) DATA SCHEDULING AND SWITCHING METHOD, APPARATUS, SYSTEM

(71) Applicant: Huawei Technologies Co., Ltd., Shenzhen (CN)

(72) Inventors: Xiaoling Yang, Shenzhen (CN); Dongyu Geng, Shenzhen (CN); Huixiao Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 14/874,358

(22) Filed: Oct. 2, 2015

(65) Prior Publication Data
US 2016/0037240 A1    Feb. 4, 2016

Related U.S. Application Data

(63) Continuation of application No. PCT/CN2013/085396, filed on Oct. 17, 2013.

(30) Foreign Application Priority Data
Apr. 3, 2013    (CN) .......................... 2013 1 0116124

(51) Int. Cl.
H04J 14/00        (2006.01)
H04Q 11/00       (2006.01)

(52) U.S. Cl.
CPC ..... H04Q 11/0003 (2013.01); H04Q 11/0005 (2013.01); H04Q 11/0062 (2013.01); H04Q 2011/0039 (2013.01); H04Q 2011/0064 (2013.01); H04Q 2011/0094 (2013.01)

(58) Field of Classification Search
None
See application file for complete search history.

(56) References Cited

U.S. PATENT DOCUMENTS 6,647,208 B1    11/2003 Kirby
7,457,277 B1 *  11/2008 Sharma ................... H04L 45/02
                                                            370/351

(Continued)

FOREIGN PATENT DOCUMENTS

CN    1315310        10/2001
CN    1633104 A      6/2005

(Continued)

OTHER PUBLICATIONS

Zhangxiao Feng, "Resource Allocation in Electrical/Optical Hybrid Switching Data Center Networks," Optical communication Network/ vol. 9, Aug. 8, 2017, pp. 648-657.*

(Continued)

Primary Examiner — Tesfaldet Bocure
(74) Attorney, Agent, or Firm — Slater Matsil, LLP

(57) ABSTRACT

Embodiments of the present invention relate to the communications field, and in particular, to a data scheduling and switching method, apparatus, and system. A data packet is distributed to an optical switching unit or an electrical switching unit for switching by using a control policy. The data packet may be switched by using an electrical packet switching module of the data switching apparatus, or may be switched by using an optical packet switching module.

20 Claims, 18 Drawing Sheets

(56) References Cited

U.S. PATENT DOCUMENTS

| | | | |
|---|---|---|---|
| 7,747,168 B2* | 6/2010 | Ryu | H04J 14/0227 398/52 |
| 9,806,909 B2* | 10/2017 | Wang | H04L 12/6418 |
| 2003/0128911 A1* | 7/2003 | Ravikanth | H04Q 11/0005 385/16 |
| 2004/0018016 A1 | 1/2004 | O'Mahony et al. | |
| 2006/0147206 A1 | 7/2006 | Ryu | |
| 2010/0049885 A1* | 2/2010 | Chandra | H04L 45/62 710/36 |
| 2012/0099863 A1 | 4/2012 | Xu et al. | |
| 2012/0201538 A1* | 8/2012 | Uekama | H04L 45/62 398/51 |
| 2012/0201540 A1* | 8/2012 | Uekama | H04L 47/2441 398/54 |
| 2014/0056371 A1* | 2/2014 | Ji | H04L 27/2697 375/260 |
| 2014/0205292 A1* | 7/2014 | Mori | H04Q 11/0005 398/54 |
| 2014/0255022 A1 | 9/2014 | Zhong | |
| 2014/0269351 A1 | 9/2014 | Graves et al. | |

FOREIGN PATENT DOCUMENTS

| | | |
|---|---|---|
| CN | 101060392 A | 10/2007 |
| CN | 101188461 A | 5/2008 |
| CN | 101860925 A | 10/2010 |
| CN | 102104545 A | 6/2011 |
| CN | 102160341 A | 8/2011 |
| CN | 102726058 | 10/2012 |
| CN | 103312397 | 9/2013 |
| EP | 1791276 A1 | 5/2007 |
| EP | 2458761 A1 | 5/2012 |
| JP | 62234135 | 10/1987 |
| JP | 2003533150 A | 11/2003 |
| JP | 2004140451 A | 5/2004 |
| JP | 2005515735 A | 5/2005 |
| WO | 0186998 A1 | 11/2001 |
| WO | 03061329 A2 | 7/2003 |
| WO | 2014161291 | 10/2014 |
| WO | 2015109606 | 7/2015 |
| WO | 2015131380 | 9/2015 |

OTHER PUBLICATIONS

Wang, G. et al., "c-Through: Part-time Optics in Data Centers," Proceedings of the ACM SIGCOMM 2010 Conference, Association for Computing Machinery, Sep. 2010, 12 pages.

Ma, et al., "Hybrid Photonic Ethernet Switch for Datacenters", Optical Fiber Communications Conference and Exhibition (OFC), Mar. 9-13, 2014, 3 pages.

Wang, et al., "c-Through: Partim-time Optics in Data Centers", ACM SIGCONMM Computer Communication Review—SIGCOMM '10, vol. 40 Issue 4.

Christodoulopoulos, Konstantinos, et al., "Topology Configuration in Hybrid EPS/OCS Interconnects," Euro-Par 2012 Parallel Processing, Aug. 27, 2012, pp. 701-715.

Farrington, Nathan, et al., "Helios: A Hybrid Electrical/Optical Switch Architecture for Modular Data Centers," SIGCOMM, Aug. 30-Sep. 3, 2010, 12 pages.

Wei, Wei et al.,"GMPLS-based multiterabit optical router: design and experimentation",Proceesings Optical Diagnostics of Living Cells II, vol. 4910, Sep. 9, 2002, 12 pages.

* cited by examiner

DATA SCHEDULING AND SWITCHING METHOD, APPARATUS, SYSTEM

This application is a continuation of International Application No. PCT/CN2013/085396, filed on Oct. 17, 2013, which claims priority to Chinese Patent Application No. 201310116124.1, filed on Apr. 3, 2013, both of which are hereby incorporated by reference in their entireties.

TECHNICAL FIELD

The present invention relates to the field of communications technologies, and in particular, to a data scheduling and switching method, apparatus, and system.

BACKGROUND

A data center is a platform on which centralized management and sharing of information within an enterprise or an organization and between enterprises or organizations are implemented, and information services and decision support are provided. The data center implements centralized processing, storage, transmission, switching, and management of information in physical space, for example, a building. A computer device, a server device, a network device, and a storage device are key devices in a data center equipment room. With the development of video streams, social services, and cloud computing, requirements on interaction of massive data between data center servers are increasing, which requires a high-efficiency interconnection solution to be designed in a data center network, so as to provide higher bandwidth with lower delay. However, due to limitations of technologies of a backplane, energy consumption, and the like, an electrical switching technology cannot meet requirements on bandwidth and delay in a data center.

In a C-through architecture proposed by the Rice University, Carnegie University, and Intel Labs, a configurable optical switching device is added to an existing data center. When a long data flow, for example, whose length reaches 1s, needs to be transmitted over a communications connection between two TOR (top of rack) switches, a central controller configures an optical connection with high-speed broadband for this pair of TOR switches, and the two TOR switches communicate with each other by using an optical network provided by the optical switching device. However, some other TOR switches use an electrical network to exchange data if only a small amount of data is transmitted. In this way, the optical network undertakes switching of a long data flow, and the electrical network undertakes switching of small-sized traffic.

However, the configurable optical switching device is mainly responsible for data switching in a long data flow (for example, data backup), and when a network mainly serves a short data flow that is similar to a social service, optical switching plays a minor role, and therefore, a capacity of a switching network cannot be effectively improved, and energy consumption cannot be greatly reduced.

SUMMARY

A data scheduling and switching method, apparatus, and system provided in embodiments of the present invention is used to improve a capacity of a data switching network in addition to reducing energy consumption.

According to a first aspect, an embodiment of the present invention provides a data scheduling method, where the method includes: receiving a data packet, where the data packet carries control information; determining, according to the control information, whether to perform optical switching or perform electrical switching on the data packet; and implementing control of optical switching on the data packet according to the control information if it is determined to perform optical switching on the data packet, or implementing control of electrical switching on the data packet according to the control information if it is determined to perform electrical switching on the data packet.

With reference to the first aspect, in a first implementation manner, the method further includes: sending a data packet obtained after the optical switching or the electrical switching, where the optical switching and the electrical switching are completed under control implemented according to the control information.

With reference to the first aspect or the first implementation manner of the first aspect, in a second implementation manner, the control information includes routing information of the data packet and a packet length of the data packet; and if the packet length of the data packet is greater than a packet length threshold, it is determined to perform optical switching on the data packet, or if the packet length of the data packet is less than a packet length threshold, it is determined to perform electrical switching on the data packet.

With reference to the first aspect or the first implementation manner of the first aspect, in a third implementation manner, the control information includes routing information of the data packet and priority information of the data packet; an output port that is of an optical switching unit and corresponding to a destination address carried in the routing information of the data packet is determined. The optical switching unit is configured to perform optical switching on the data packet. If the determined output port that is of the optical switching unit and corresponding to the data packet is non-idle, it is determined to perform electrical switching on the data packet. If the determined output port that is of the optical switching unit and corresponding to the data packet is idle, it is determined whether a conflict data packet currently exists. An input port that is of the optical switching unit and corresponding to the conflict data packet is different from an input port that is of the optical switching unit and corresponding to the data packet, an output port that is of the optical switching unit and corresponding to the conflict data packet is the same as the output port that is of the optical switching unit and corresponding to the data packet, and the input port that is of the optical switching unit and corresponding to the conflict data packet is an input port that is of the optical switching unit and corresponding to a source address in routing information of the conflict data packet. If the conflict data packet does not exist, it is determined to perform optical switching on the data packet. If a conflict data packet exists, it is determined, according to the priority information of the data packet, whether a priority of the data packet is higher than priorities of all conflict data packets, and if the priority of the data packet is higher than the priorities of all the conflict data packets, it is determined to perform optical switching on the data packet.

With reference to the second or the third implementation manner of the first aspect, in a fourth implementation manner, control of optical switching on the data packet is implemented according to the routing information of the data packet, or control of electrical switching on the data packet is implemented according to the routing information of the data packet.

With reference to the third or the fourth implementation manner of the first aspect, in a fifth implementation manner, if the determined output port that is of the optical switching unit and corresponding to the data packet is idle, a conflict data packet exists, and the priority of the data packet is lower than or equal to a priority of any conflict data packet, it is determined to perform electrical switching on the data packet.

With reference to the first aspect, or the first or the second or the third implementation manner of the first aspect, in a sixth implementation manner, if it is determined to perform optical switching on the data packet, the method further includes: extracting a data frame from the data packet, and encapsulating the data frame into an optical packet; and then, implementing control of optical switching on the optical packet according to the control information.

With reference to the sixth implementation manner of the first aspect, in a seventh implementation manner, the optical packet includes a preamble, a frame start flag, the data frame, and a frame end flag, and a length of the preamble is greater than or equal to a quantity of bits that need to be consumed by status adjustment performed by a receiver of the optical packet in order to correctly receive the optical packet.

With reference to the seventh implementation manner of the first aspect, in an eighth implementation manner, the method further includes: before control of optical switching on a next optical packet of a current optical packet is implemented, setting a first guard interval after the frame end flag of the current optical packet and before a preamble of the next optical packet, where duration of the first guard interval is greater than or equal to a time for performing status adjustment by the optical switching unit before optical switching is performed on the next optical packet.

With reference to the sixth implementation manner of the first aspect, in a ninth implementation manner, before the encapsulating the data frame into an optical packet, the method further includes: determining whether an output port that is of the optical switching unit and corresponding to the data frame in the data packet is consistent with an output port that is of the optical switching unit and corresponding to a data frame in a previous data packet, and if they are consistent, encapsulating the data frame in the data packet into the optical packet, where the optical packet includes a frame start flag, the data frame in the data packet, and a frame end flag.

With reference to the ninth implementation manner of the first aspect, in a tenth implementation manner, the method further includes: before control of optical switching on the optical packet encapsulated from the data frame in the data packet is implemented, setting a second guard interval after a frame end flag of an optical packet encapsulated from the data frame in the previous data packet and before the frame start flag of the optical packet encapsulated from the data frame in the data packet. Preferably, duration of the second guard interval is less than a time for performing status adjustment by the optical switching unit before optical switching is performed on the optical packet encapsulated from the data frame in the data packet.

According to a second aspect, an embodiment of the present invention provides a data scheduling apparatus that includes a receiving unit, a determining unit, and a control unit. The receiving unit is configured to receive a data packet, and send the data packet to the determining unit. The determining unit is configured to: receive the data packet sent by the receiving unit, where the data packet carries control information, and to determine, according to the control information, whether optical switching or electrical switching is to be performed on the data packet. The control unit is configured to: implement control of optical switching on the data packet according to the control information if the determining unit determines that optical switching is to be performed on the data packet; or implement control of electrical switching on the data packet according to the control information if it is determined to perform electrical switching on the data packet.

With reference to the second aspect, in a first implementation manner, the apparatus may further include a sending unit, where: the sending unit is configured to send a data packet obtained after the optical switching or the electrical switching, where the optical switching and the electrical switching are completed under control implemented by the control unit according to the control information.

With reference to the second aspect or the first implementation manner of the second aspect, in a second implementation manner, the apparatus further includes: an electrical switching unit, configured to perform electrical switching on the data packet; where the control unit is specifically configured to: if it is determined to perform electrical switching on the data packet, control, according to the control information, the electrical switching unit to perform electrical switching on the data packet.

With reference to the second aspect, or the first implementation manner or the second implementation manner of the second aspect, in a third implementation manner, the apparatus further includes: an optical switching unit, configured to perform optical switching on the data packet; where the control unit is specifically configured to: if it is determined to perform optical switching on the data packet, control, according to the control information, the optical switching unit to perform optical switching on the data packet.

With reference to the second aspect, or the first implementation manner or the second implementation manner or the third implementation manner of the second aspect, in a fourth implementation manner, the control information includes routing information of the data packet and a packet length of the data packet; and the determining unit is specifically configured to: if the packet length of the data packet is greater than or equal to a packet length threshold, determine that optical switching is to be performed on the data packet; or if the packet length of the data packet is less than a packet length threshold, determine that electrical switching is to be performed on the data packet.

With reference to the second aspect, or the first implementation manner or the second implementation manner or the third implementation manner of the second aspect, in a fifth implementation manner, the control information includes routing information of the data packet and priority information of the data packet; and the determining unit is specifically configured to: determine an output port that is of an optical switching unit and corresponding to a destination address carried in the routing information of the data packet, where the optical switching unit is configured to perform optical switching on the data packet; and if the determined output port that is of the optical switching unit and corresponding to the data packet is non-idle, determine that electrical switching is to be performed on the data packet; or if the determined output port that is of the optical switching unit and corresponding to the data packet is idle, determine whether a conflict data packet currently exists, where an input port that is of the optical switching unit and corresponding to the conflict data packet is different from an input port that is of the optical switching unit and corresponding to the data packet, an output port that is of the optical switching unit and corresponding to the conflict data packet is the same as the output port that is of the optical switching unit and corresponding to the data packet, and the input port that is of the optical switching unit and corresponding to the conflict data packet is an input port that is of the optical switching unit and corresponding to a source address in routing information of the conflict data packet; where if the conflict data packet does not exist, it is determined to perform optical switching on the data packet; or if the conflict data packet exists, it is determined, according to the priority information of the data packet, whether a priority of the data packet is higher than priorities of all conflict data packets, and if the priority of the data packet is higher than the priorities of all the conflict data packets, it is determined to perform optical switching on the data packet.

With reference to the fourth or the fifth implementation manner of the second aspect, in a sixth implementation manner, the control unit is specifically configured to: implement control of optical switching on the data packet according to the routing information of the data packet if it is determined to perform optical switching on the data packet; or implement control of electrical switching on the data packet according to the routing information of the data packet if it is determined to perform electrical switching on the data packet.

With reference to the fifth or the sixth implementation manner of the second aspect, in a seventh implementation manner, the determining unit is further configured to: if the determined output port that is of the optical switching unit and corresponding to the data packet is idle, a conflict data packet exists, and the priority of the data packet is lower than or equal to a priority of any conflict data packet, determine that electrical switching is to be performed on the data packet.

With reference to the second aspect and any one of the foregoing several implementation manners of the second aspect, in an eighth implementation manner, the control unit is further specifically configured to: if it is determined to perform optical switching on the data packet, extract a data frame from the data packet, encapsulate the data frame into an optical packet, and implement control of optical switching on the optical packet according to the control information.

With reference to the eighth implementation manner of the second aspect, in a ninth implementation manner, the optical packet includes a preamble, a frame start flag, the data frame, and a frame end flag, and a length of the preamble is greater than or equal to a quantity of bits that need to be consumed by status adjustment performed by a receiver of the optical packet in order to correctly receive the optical packet.

With reference to the ninth implementation manner of the second aspect, in a tenth implementation manner, the control unit is further configured to: before implementing control of optical switching on a next optical packet of the current optical packet, set a first guard interval after the frame end flag of the current optical packet and before a preamble of the next optical packet, where duration of the first guard interval is greater than or equal to a time for performing status adjustment by the optical switching unit before optical switching is performed on the next optical packet.

With reference to the eighth implementation manner of the second aspect, in an eleventh implementation manner, the control unit is further specifically configured to: determine whether an output port that is of the optical switching unit and corresponding to the data frame in the data packet is consistent with an output port that is of the optical switching unit and corresponding to a data frame in a previous data packet of the data packet, and if they are consistent, encapsulate the data frame in the data packet into the optical packet, where the optical packet includes a frame start flag, the data frame in the data packet, and a frame end flag; and implement, according to the control information of the data packet, control of optical switching on the optical packet encapsulated from the data frame in the data packet.

With reference to the eleventh implementation manner of the second aspect, in a twelfth implementation manner, the control unit is further specifically configured to: before implementing, according to the control information of the data packet, control of optical switching on the optical packet encapsulated from the data frame in the data packet, set a second guard interval after a frame end flag of an optical packet encapsulated from the data frame in the previous data packet and before the frame start flag of the optical packet encapsulated from the data frame in the data packet. Preferably, duration of the second guard interval is less than a time for performing status adjustment by the optical switching unit before optical switching is performed on the optical packet encapsulated from the data frame in the current data packet.

According to a third aspect, an embodiment of the present invention provides a data switching apparatus, where the apparatus includes more than one input port, more than one output port, a data packet distribution and scheduling unit, and an electrical switching unit, where the data packet distribution and scheduling unit is connected to an input port of the data switching apparatus and is configured to receive a data packet through the input port of the data switching apparatus, where the data packet carries control information; and the data packet distribution and scheduling unit is further configured to determine, according to the control information, whether optical switching or electrical switching is to be performed on the data packet; the data packet distribution and scheduling unit is further connected to an input port of the electrical switching unit, so as to send, to the electrical switching unit, the data packet on which electrical switching is determined to be performed; the electrical switching unit is configured to perform electrical switching on the data packet sent by the data packet distribution and scheduling unit; the electrical switching unit includes more than one input port, configured to receive the data packet sent by the data packet distribution and scheduling unit, and more than one output port connected to the data packet distribution and scheduling unit, configured to send, to the data packet distribution and scheduling unit, a data packet obtained after the electrical switching; and the data packet distribution and scheduling unit is further connected to an output port of the data switching apparatus, receives the data packet that is obtained after the electrical switching and sent by the electrical switching unit, and sends, through the connected output port of the data switching apparatus, the data packet obtained after the electrical switching.

With reference to the third aspect, in a first implementation manner, the apparatus further includes an optical switching unit, where: the data packet distribution and scheduling unit is further connected to an input port of the optical switching unit, so as to send, to the optical switching unit, the data packet on which optical switching is determined to be performed; the optical switching unit is configured to perform optical switching on the data packet sent by the data packet distribution and scheduling unit; the optical switching unit includes more than one input port, configured to receive the data packet sent by the data packet distribution and scheduling unit, and more than one output port that is connected to the data packet distribution and scheduling unit and is configured to send, to the data packet distribution and scheduling unit, a data packet obtained after the optical switching; and the data packet distribution and scheduling unit is further configured to receive the data packet that is obtained after the optical switching and sent by the optical switching unit, and send, through the connected output port of the data switching apparatus, the data packet obtained after the optical switching.

With reference to the first implementation manner of the third aspect, in a second implementation manner, the data packet distribution and scheduling unit specifically includes: more than one data packet distribution module, a central control scheduling module, and more than one data packet sending module, where each data packet distribution module is connected to one input port of the data switching apparatus so as to: receive a data packet through the connected input port of the data switching apparatus, extract control information of the data packet from the data packet, and send the control information to the central control scheduling module; the central control scheduling module is configured to: receive the control information that is of the data packet and sent by the data packet distribution module, determine, according to the control information, distribution information corresponding to the data packet, and send the distribution information to the data packet distribution module, where the distribution information is used to indicate whether the data packet is to be switched by the optical switching unit or is to be switched by the electrical switching unit; and control, according to the control information of the data packet, the optical switching unit or the electrical switching unit to perform switching on the data packet; each data packet distribution module is further connected to one input port of the optical switching unit and one input port of the electrical switching unit; each data packet distribution module is configured to receive the distribution information that is of the data packet and sent by the central control scheduling module, and determine, according to the distribution information, whether to send the data packet to the optical switching unit or send the data packet to the electrical switching unit; if the distribution information indicates that the data packet is to be switched by the optical switching unit, convert the data packet into an optical packet and send the optical packet to the optical switching unit through the connected input port of the optical switching unit, so that the optical switching unit performs optical switching on the optical packet under control implemented by the central control scheduling module according to control information of the optical packet, and sends, through an output port of the optical switching unit, an optical packet obtained after the optical switching to a data packet sending module connected to the output port; and if the distribution information indicates that the data packet is to be switched by the electrical switching unit, send the data packet to the electrical switching unit through the connected input port of the electrical switching unit, so that the electrical switching unit performs electrical switching on the data packet under control implemented by the central control scheduling module according to the control information of the data packet, and sends, through an output port of the electrical switching unit the data packet obtained after the electrical switching to a data packet sending module connected to the output port; and each data packet sending module is connected to one output port of the optical switching unit and one output port of the electrical switching unit so as to receive, through the connected output port of the optical switching unit, a data packet sent by the optical switching unit, or receive, through the connected output port of the electrical switching unit, a data packet sent by the electrical switching unit; each data packet sending module is further connected to one output port of the data switching apparatus so as to send, through the connected output port of the data switching apparatus, a received data packet obtained after optical switching or a received data packet obtained after electrical switching.

With reference to the second implementation manner of the third aspect, in a third implementation manner, the control information of the data packet includes the routing information of the data packet and a packet length of the data packet; and the central control scheduling module is specifically configured to: receive the routing information of the data packet and the packet length of the data packet that are sent by the data packet distribution module; if the packet length of the data packet is greater than or equal to a packet length threshold, determine that the distribution information corresponding to the data packet indicates that the data packet is to be switched by the optical switching unit; or if the packet length of the data packet is less than a packet length threshold, determine that the distribution information corresponding to the data packet indicates that the data packet is to be switched by the electrical switching unit; send the distribution information to the data packet distribution module; and control, according to the routing information of the data packet, the optical switching unit or the electrical switching unit to perform switching on the data packet.

With reference to the second implementation manner of the third aspect, in a fourth implementation manner, the control information of the data packet includes the routing information of the data packet and priority information of the data packet; and the central control scheduling module is specifically configured to: receive the routing information of the data packet and the priority information of the data packet that are sent by the data packet distribution module; determine an output port that is of the data switching apparatus and corresponding to a destination address carried in the routing information, and determine, according to the determined output port of the data switching apparatus, an output port that is of the optical switching unit and connected, by using the data packet sending module, to the output port of the data switching apparatus; and if the determined output port that is of the optical switching unit and corresponding to the data packet is non-idle, determine that the distribution information of the data packet indicates that the data packet is to be switched by the electrical switching unit; or if the determined output port that is of the optical switching unit and corresponding to the data packet is idle, determine whether a conflict data packet currently exists, where an input port that is of the optical switching unit and corresponding to the conflict data packet is different from an input port that is of the optical switching unit and corresponding to the data packet, an output port that is of the optical switching unit and corresponding to the conflict data packet is the same as the output port that is of the optical switching unit and corresponding to the data packet, the input port that is of the optical switching unit and corresponding to the conflict data packet is an input port that is of the optical switching unit and connected to an input port, of the data switching apparatus, corresponding to a source address in routing information of the conflict data packet, and the input port of the data switching apparatus is connected to the input port of the optical switching unit by using the data packet distribution module; where if the conflict data packet does not exist, it is determined that the distribution information of the data packet indicates that the data packet is to be switched by the optical switching unit; or if a conflict data packet exists, it is determined, according to the priority information of the data packet, whether a priority of the data packet is higher than priorities of all conflict data packets, and if the priority of the data packet is higher than the priorities of all the conflict data packets, it is determined that the distribution information of the data packet indicates that the data packet is to be switched by the optical switching unit; and control, according to the routing information of the data packet, the optical switching unit or the electrical switching unit to perform switching on the data packet.

With reference to the fourth implementation manner of the third aspect, in a fifth implementation manner, the central control scheduling module is further specifically configured to: if the determined output port that is of the optical switching unit and corresponding to the data packet is idle, a conflict data packet exists, and the priority of the data packet is lower than or equal to a priority of any conflict data packet, determine that the distribution information of the data packet indicates that the data packet is to be switched by the electrical switching unit.

With reference to any one of the second implementation manner to the fifth implementation manner of the third aspect, in a sixth implementation manner, the data packet distribution module specifically includes: a data packet receiving and processing submodule, a first storage submodule, and an optical packet encapsulation submodule, where the data packet receiving and processing submodule is connected to the input port of the data switching apparatus so as to: receive a data packet through the connected input port of the data switching apparatus, parse out a data frame from the data packet, extract control information of the data packet from the data frame, send the control information to the central control scheduling module, and store the data frame in the first storage submodule; the central control scheduling module is specifically configured to: receive the control information that is of the data packet and sent by the data packet receiving and processing submodule, and determine the distribution information of the data packet according to the control information; and if the distribution information indicates that the data packet is to be switched by the optical switching unit, instruct the first storage submodule to send the stored data frame of the data packet to the optical packet encapsulation submodule of the data packet distribution module; and the optical packet encapsulation submodule is connected to an input port of the optical switching unit, and the optical packet encapsulation submodule is configured to encapsulate the data frame received from the first storage submodule into an optical packet, and send the optical packet to the optical switching unit through the connected input port of the optical switching unit.

With reference to the sixth implementation manner of the third aspect, in a seventh implementation manner, the central control scheduling module is further configured to: before instructing the first storage submodule of the data packet distribution module to send a next data frame to the optical packet encapsulation submodule of the data packet distribution module, determine whether an output port that is of the optical switching unit and corresponding to a destination address in routing information corresponding to the next data frame is the same as an output port that is of the optical switching unit and corresponding to a current data frame, and if they are the same, instruct the optical packet encapsulation submodule to send, after completing sending a frame end flag of an optical packet encapsulated from the current data frame, a frame start flag of an optical packet encapsulated from the next data frame, where the optical packet encapsulated from the next data frame includes the frame start flag, the next data frame, and a frame end flag.

With reference to the sixth implementation manner of the third aspect, in an eighth implementation manner, the central control scheduling module is further configured to: before instructing the first storage submodule of the data packet distribution module to send a next data frame to the optical packet encapsulation submodule of the data packet distribution module, determine whether an output port that is of the optical switching unit and corresponding to a destination address in routing information corresponding to the next data frame is the same as an output port that is of an optical packet switching unit and corresponding to a current data frame, and if they are the same, instruct the optical packet encapsulation submodule to, after completing sending a frame end flag of an optical packet encapsulated from the current data frame, first set a second guard interval, and then send a frame start flag of a next optical packet encapsulated from the next data frame, where the next optical packet encapsulated from the next data frame includes the frame start flag, the next data frame, and a frame end flag. Preferably, duration of the second guard interval is less than a time for performing status adjustment by the optical switching unit before optical switching is performed on the next optical packet.

According to a fourth aspect, an embodiment of the present invention further provides another data switching apparatus, where the apparatus includes more than one input port, more than one output port, an electrical switching unit, an optical switching unit, and a control unit, where the electrical switching unit is connected to an input port of the data switching apparatus so as to: receive a data packet through the connected input port of the data switching apparatus, extract control information from the data packet, and send the control information to the control unit; the electrical switching unit performs electrical switching on the data packet under control implemented by the control unit according to the control information; and the electrical switching unit is connected to an output port of the data switching apparatus so as to send, through the connected output port of the data switching apparatus, a data packet obtained after the electrical switching; the optical switching unit is connected to an input port of the data switching apparatus so as to: receive a data packet through the connected input port of the data switching apparatus, extract control information from the data packet, and send the control information to the control unit; the optical switching unit is configured to perform optical switching on the data packet under control implemented by the control unit according to the control information; and the optical switching unit is connected to an output port of the data switching apparatus so as to send, through the connected output port of the data switching apparatus, a data packet obtained after the optical switching; and the control unit is configured to receive control information that is of the data packet and sent by the electrical switching unit or the optical switching unit, and control, according to the control information, the electrical switching unit or the optical switching unit to perform electrical switching or optical switching on the data packet.

With reference to the fourth aspect, in a first implementation manner, the optical switching unit specifically includes: a pre-processing module, a post-processing module, and an optical switching module, where the pre-processing module is connected to one or more than one input port of the data switching apparatus so as to: receive a data packet through a connected input port of the data switching apparatus, extract control information and a data frame from the data packet, send the control information to the control unit, encapsulate the data frame into an optical packet, and send the optical packet to the optical switching module; the optical switching module includes more than one input port and more than one output port; the optical switching module is configured to receive, through an input port of the optical switching module, the optical packet sent by the pre-processing module, perform optical switching on the optical packet under control implemented by the control unit according to the control information, and send an optical packet obtained after the switching to the post-processing module through an output port of the optical switching module; and the post-processing module is connected to one or more than one output port of the data switching apparatus so as to: receive the optical packet sent by the optical switching module through the output port of the optical switching module, extract a data frame from the optical packet, encapsulate the data frame into a data packet, and send the data packet through a connected output port of the data switching apparatus.

According to a fifth aspect, an embodiment of the present invention provides a network device, where the network device includes at least one first physical link port, at least one second physical link port, and a data packet distribution module, where the data packet distribution module is configured to distribute a received data packet to a first physical link port so as to send the data packet by using a first physical link connected to the first physical link port, so that optical switching is performed by a receiver on the data packet; or distribute a received data packet to a second physical link port so as to send the data packet by using a second physical link connected to the second physical link port, so that electrical switching is performed by a receiver on the data packet.

With reference to the fifth aspect, in a first implementation manner, the data packet distribution module is specifically configured to: if a packet length of the received data packet is greater than or equal to a packet length threshold, distribute the data packet to the first physical link port so as to send the data packet by using the first physical link connected to the first physical link port, so that optical switching is performed by the receiver on the data packet; otherwise, distribute the data packet to the second physical link port so as to send the data packet by using the second physical link connected to the second physical link port, so that electrical switching is performed by the receiver on the data packet.

According to a sixth aspect, an embodiment of the present invention provides a data switching system, where the system includes: a network device, and any data switching apparatus provided in the embodiments of the present invention, where the network device is connected to an input port of the data switching apparatus so as to send a data packet to the data switching apparatus through the connected input port of the data switching apparatus; and the data switching apparatus is configured to receive the data packet from the network device through the input port of the data switching apparatus, and send, through an output port of the data switching apparatus, to another network device, the data packet after being switched.

According to a seventh aspect, an embodiment of the present invention further provides another data switching system, where the system includes: any network device provided in the embodiments of the present invention, and the data switching apparatus correspondingly provided in the embodiments of the present invention and connected to the network device, where a first physical link port of the network device is connected to an input port of the data switching apparatus by using a first physical link, and a second physical link port of the network device is connected to another input port of the data switching apparatus by using a second physical link; where the network device is configured to: send a data packet to the data switching apparatus by using the first physical link and the connected input port of the data switching apparatus, so that the data switching apparatus performs optical switching on the data packet; and send a data packet to the data switching apparatus by using the second physical link and the connected input port of the data switching apparatus, so that the data switching apparatus performs electrical switching on the data packet.

It can be seen that in the data scheduling method and apparatus, and the data switching apparatus and system according to the embodiments of the present invention, optical switching or electrical switching is performed on a data packet according to control information carried in the data packet, control of optical switching on the data packet is implemented according to the control information if it is determined to perform optical switching on the data packet, or control of electrical switching on the data packet is implemented according to the control information if it is determined to perform electrical switching on the data packet, which implements an effective combination of an electrical switching technology and an optical switching technology. The data packet may be switched by using an electrical switching unit or may be switched by using an optical switching unit, thereby better scheduling an optical switching resource and an electrical switching resource in a comprehensive manner, and improving a capacity of a data switching network in addition to reducing energy consummation.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To understand the present invention more clearly, the following uses a model of a typical large-capacity data center network for description. However, it should be understood that, application of a data switching apparatus, system and method provided in the embodiments of the present invention are not limited to a data center.

Figure 1:
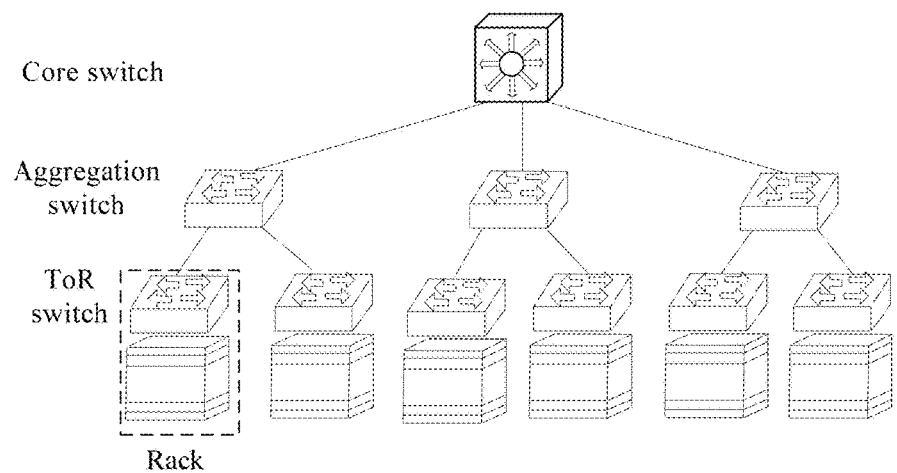
FIG. 1 is a schematic diagram of a data center network model.

FIG. 1 is a model of a traditional data center network. A server serves as a leaf node of a tree structure and is generally connected to a TOR switch through a 1 Gps network interface. The TOR switch, an aggregation switch, and a core switch each serves as another node of a tree, where the core switch may serve as a root node. The TOR switch is connected to the aggregation switch through an interface with a higher rate, for example, a 10 Gps interface, and the aggregation switch is connected to the core switch through an interface with a further higher rate, for example, a 40 Gps interface. Traffic generated by the server is aggregated layer by layer by using the TOR switch, the aggregation switch, and the core switch, and therefore, a higher switching capacity needs to be provided for a switch that is closer to the root node to meet a requirement.

Figure 2:
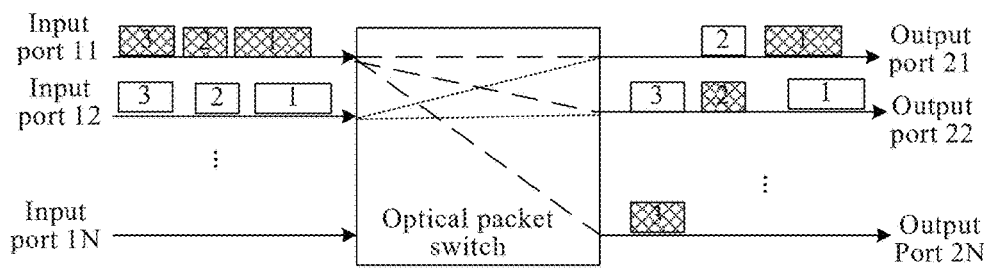
FIG. 2 is a schematic diagram of a process of optical packet switching.

An optical packet switching technology may also be referred to as an optical packet switching technology, and the optical packet switching technology is an extension of an electrical packet switching technology in an optical domain, that is, a packet (referred to as an "optical packet") is used as a granularity to implement a switching technology in the optical domain. Generally, an optical packet includes an optical packet payload and an optical packet header. In a control module, routing information is obtained by reading information in the optical packet header, a status of an optical switch is adjusted according to the routing information before the optical packet payload arrives at the optical switch, and then the optical packet payload is switched, by using the optical switch, to an expected output port. The optical packet switching technology uses a multipoint-to-multipoint communication manner. As shown in FIG. 2, when being switched by using an optical packet switch, optical packets (optical packets 1 to 3, and the like) from different input ports (input ports 11 to 1N) are switched by a switching unit to different output ports (output ports 21 to 2N) without any processing and sent to different optical packet receiving ends. Therefore, optical packets received by a same optical packet receiving end may be from different transmit ends. For example, an optical packet receiving end connected to output port 22 receives optical packet 2 from input port 11 and optical packet 1 and optical packet 3 from input port 12.

Figure 3A:
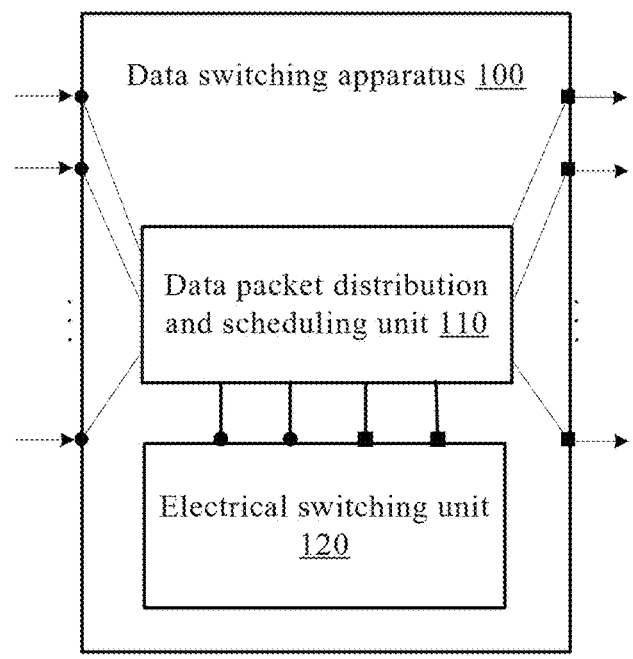
FIG. 3a and FIG. 3b are schematic structural diagrams of a data switching apparatus according to an embodiment of the present invention.

FIG. 3a is a schematic diagram of a logical structure of a data switching apparatus 100 according to an embodiment of the present invention. As shown in FIG. 3a, the apparatus 100 includes more than one input port (as shown by circles in the apparatus 100 in FIG. 3a), more than one output port (as shown by squares in the apparatus 100 in FIG. 3a), a data packet distribution and scheduling unit 110, and an electrical switching unit 120.

The data packet distribution and scheduling unit 110 is connected to input ports of the data switching apparatus 100 and is configured to: receive a data packet through the input port of the data switching apparatus 100, where the data packet carries control information; and determine, according to the control information, whether optical switching or electrical switching is to be performed on the data packet.

The data packet distribution and scheduling unit 110 is further connected to each input port (as shown by a circle in the electrical switching unit 120) and each output port (as shown by a square in the electrical switching unit 120) of the electrical switching unit 120 receives the data packet through the input port of the data switching apparatus 100, and sends, to the electrical switching unit 120, through the input port of the electrical switching unit 120, the data packet on which electrical switching is determined to be performed.

The electrical switching unit 120 performs electrical switching on the data packet sent by the data packet distribution and scheduling unit 110, the electrical switching unit 120 includes more than one input port, configured to receive the data packet sent by the data packet distribution and scheduling unit 110, and more than one output port that is connected to the data packet distribution and scheduling unit 110 and is configured to send, to the data packet distribution and scheduling unit 110, a data packet obtained after the electrical switching.

The data packet distribution and scheduling unit 110 is further connected to an output port of the data switching apparatus 100 so as to: receive the data packet that is obtained after the electrical switching and sent by the electrical switching unit 120, and send, through the connected output port of the data switching apparatus 100, the data packet obtained after the electrical switching.

In an implementation manner, the data packet on which optical switching is to be performed determined by the data packet distribution and scheduling unit 110 is sent to one or more optical switching apparatuses independent of the data switching apparatus 100, and the optical switching apparatus performs optical switching on the data packet. The optical switching apparatus may be an existing optical switching apparatus, and implementation of the optical switching apparatus is not described in detail herein again.

Figure 3B:
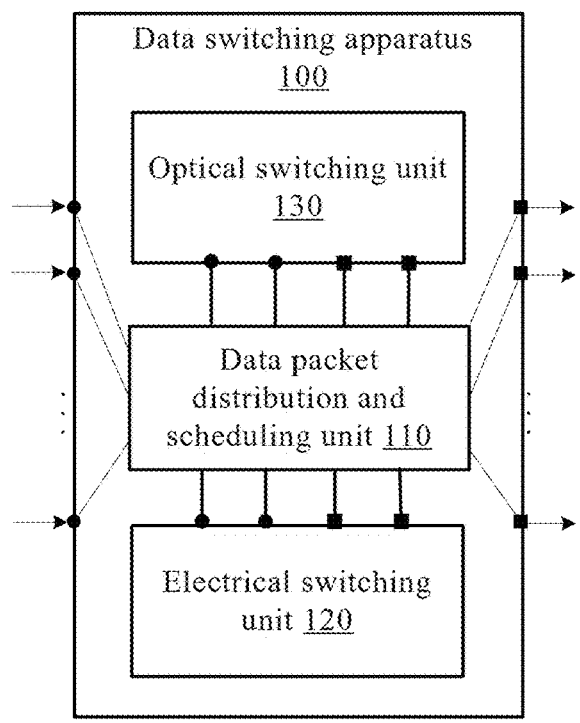

In another implementation manner, as shown in FIG. 3b, the data switching apparatus 100 provided in this embodiment of the present invention may further include an optical switching unit 130. The data packet distribution and scheduling unit 110 is further connected to an input port (as shown by a circle in the optical switching unit in FIG. 3b) of the optical switching unit 130 so as to send, to the optical switching unit 130, the data packet on which optical switching is determined to be performed. The optical switching unit 130 is configured to perform optical switching on the data packet sent by the data packet distribution and scheduling unit 110; the optical switching unit 130 includes more than one input port, configured to receive the data packet sent by the data packet distribution and scheduling unit, and more than one output port (as shown by squares in the optical switching unit in FIG. 3b) that is connected to the data packet distribution and scheduling unit 110 and is configured to send, to the data packet distribution and scheduling unit 110, a data packet obtained after the optical switching. The data packet distribution and scheduling unit 110 is further configured to receive the data packet that is obtained after the optical switching and sent by the optical switching unit 130, and send, through the connected output port of the data switching apparatus 100, the data packet obtained after the optical switching.

A person in the art should understand that in this embodiment of the present invention, a packet sent to the optical switching unit 130 is an optical packet corresponding to the data packet, and a packet sent to the electrical switching unit 120 is an electrical packet corresponding to the data packet.

Figure 3C:
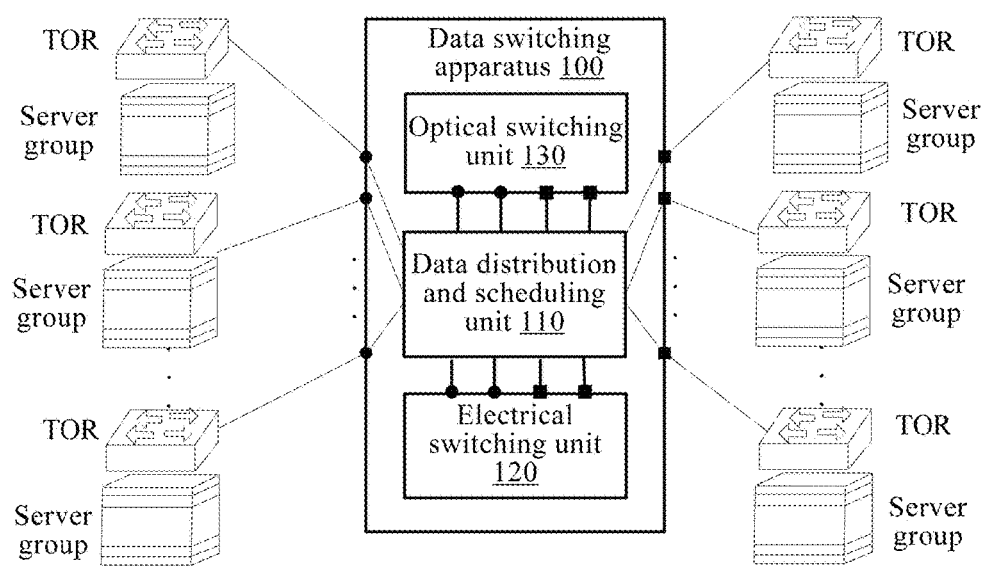
FIG. 3c is a schematic diagram of an application of a data switching apparatus according to an embodiment of the present invention.

A typical data center is used as an example. As shown in FIG. 3c, each of multiple TOR switches has a respective server group and is connected to an input port of the data switching apparatus 100 through an output port of a traditional physical interface (for example, a 10GE optical port), an input port of the TOR switch is connected to an output port of the data switching apparatus 100, and the TOR switch is further connected to the data distribution and scheduling unit 110. The data distribution and scheduling unit 110 receives Ethernet data packets that need to be switched and are sent by the TOR switches, a part of these to-be-switched Ethernet data packets are distributed by the data packet distribution and scheduling unit 110 to the electrical switching unit 120, and the electrical switching unit 120 sends, back to the data distribution and scheduling unit 110, data packets obtained after switching is completed; another part of data packets are distributed by the data packet distribution and scheduling unit 110 to the optical switching unit 130, the optical switching unit sends, back to the data packet distribution and scheduling unit 110, data packets obtained after switching is completed, and the data packet distribution and scheduling unit 110 finally sends the data packets obtained after the switching to the TOR switches.

It should be noted that the "data packet" according to this embodiment of the present invention may be an electrical packet, or may be an optical packet; or the data packet is a data packet that complies with a specific transmission protocol. A data packet received by the data switching apparatus and a data packet obtained after the switching may be an identical data packet, or may be data packets of different structures or types. For example, before the optical switching unit performs optical switching on a data packet, if the data packet is an optical packet, then optical switching may be performed on the optical packet, or if the data packet is a non-optical packet, for example, an electrical packet, it is required to convert the electrical packet into an optical packet, and then optical switching is performed on the converted optical packet.

It should be noted that, in an implementation manner, an input port and an output port of the data switching apparatus 100 provided in this embodiment of the present invention and an input port and an output port of a TOR switch may be implemented by using a same physical interface. For example, an input port of a physical interface of a TOR switch in FIG. 3c may be connected to an output port of the data switching apparatus 100, an output port of the physical interface may be connected to an input port of the data switching apparatus 100, and this input port and this output port of the data switching apparatus 100 may be physically one interface. In another implementation manner, an input port and an output port of the data switching apparatus 100 provided in this embodiment of the present invention and an input port and an output port of the TOR switch may also be implemented by using two physically independent interfaces.

It can be seen that, in the data switching apparatus provided in this embodiment of the present invention, an electrical switching technology and an optical switching technology are effectively combined, so that a data packet may be switched by using an electrical switching unit or may be switched by using an optical switching unit, which may greatly improve a switching capacity of a large-capacity core switching apparatus, and in addition, optical switching resources and electrical switching resources are better scheduled in a comprehensive way.

Figure 4:
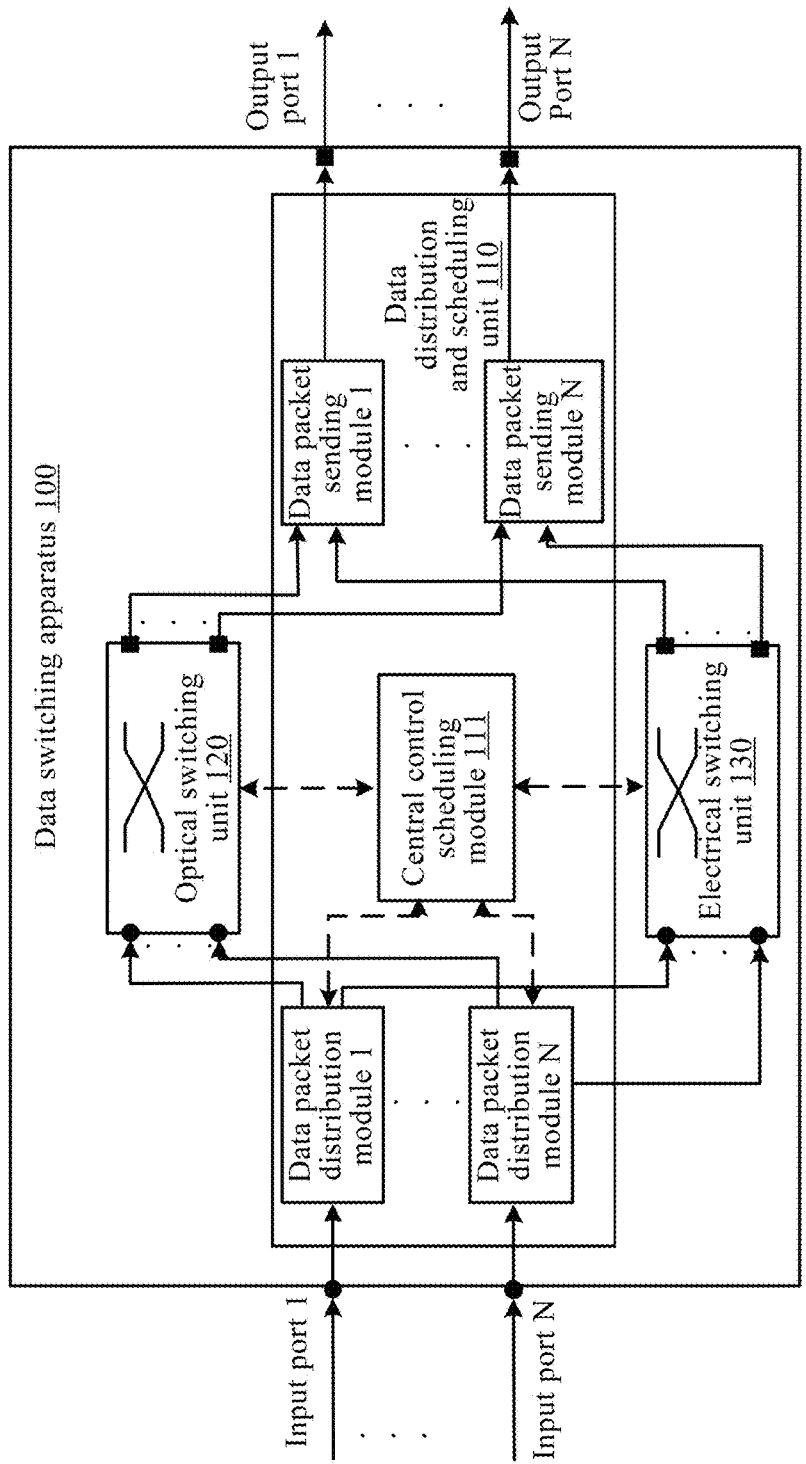
FIG. 4 is a schematic structural diagram of a data switching apparatus according to an embodiment of the present invention.

The data packet distribution and scheduling unit 110 receives a data packet, extracts control information from the data packet, and determines, according to the control information, whether electrical switching or electrical switching needs to be performed on the data packet. Specifically, FIG. 4 is a schematic structural diagram of a data switching apparatus 100 according to an embodiment of the present invention. The data switching apparatus 100 has input ports 1 to N and output ports 1 to N, and each of an optical switching unit 120 and an electrical switching unit 130 also has N input ports and N output ports.

As shown in FIG. 4, the data distribution and scheduling unit 110 includes N data packet distribution modules, N data packet sending modules, and a central control scheduling module 111. Each data packet distribution module is connected to one input port of the data switching apparatus 100, and is connected to one input port of the optical switching unit 120 and one input port of the electrical switching unit 130; each data packet sending module is connected to one output port of the data switching apparatus 100, and is connected to one output port of the optical switching unit 120 and one output port of the electrical switching unit 130.

The following uses data packet sending module 1 as an example to introduce function implementation of the apparatus.

Data packet distribution module 1 receives a data packet through connected input port 1 of the data switching apparatus 100, extracts control information of the data packet from the data packet, and sends the control information to the central control scheduling module 111.

The central control scheduling module 111 is configured to receive the control information that is of the data packet and sent by data packet distribution module 1, determine distribution information of the data packet according to the control information, and send the distribution information to data packet distribution module 1, where the distribution information is used to indicate whether the data packet is to be switched by the optical switching unit or the electrical switching unit; and control, according to the control information of the data packet, the optical switching unit 120 or the electrical switching unit 130 to perform switching on the data packet.

Specifically, the control information may include attribute information of the data packet and routing information of the data packet, and it is determined, according to one or two types of the attribute information of the data packet or the routing information of the data packet, whether to perform optical switching or perform electrical switching on the data packet. If it is determined to perform optical switching, optical switching is controlled, according to the routing information of the data packet, to be performed on the data packet; if it is determined to perform electrical switching, electrical switching is controlled, according to the routing information of the data packet, to be performed on the data packet. The attribute information of the data packet is attribute information such as a length of the data packet and a priority of the data packet; the routing information of the data packet is routing-related information such as a source address and/or a destination address carried in the data packet.

Data packet distribution module 1 receives the distribution information that is of the data packet and sent by the central control scheduling module 111, and determines, according to the distribution information, whether to send the data packet to the optical switching unit or send the data packet to the electrical switching unit.

If the distribution information indicates that the data packet is to be switched by the optical switching unit 120, the data packet is converted into an optical packet, and the optical packet is sent to the optical switching unit 120 through the connected input port of the optical switching unit 120, so that the optical switching unit 120 performs switching on the optical packet under control implemented by the central control scheduling module 111 according to control information of the optical packet, and sends, through the output port of the optical switching unit 120, an optical packet obtained after the switching to the data packet sending module connected to the output port. For example, an optical packet from data packet distribution module 1 is switched to output port j ($1 \leq j \leq N$) of the optical switching unit, where output port j is connected to data packet sending module j; then, the optical packet is sent to data packet sending module j, and data packet sending module j performs receiving processing and subsequent sending processing.

If the distribution information indicates that the data packet is to be switched by the electrical switching unit 130, the data packet is sent to the electrical switching unit 130 through the connected input port of the electrical switching unit 130, so that the electrical switching unit 130 performs switching on the data packet under control implemented by the central control scheduling module 111 according to control information of the data packet, and sends, through the output port of the electrical switching unit 130, a data packet obtained after the switching to the data packet sending module connected to the output port. For example, a data packet from data packet distribution module 1 is switched to output port i ($1 \leq i \leq N$) of the electrical switching unit, where output port i is connected to data packet sending module i; then, the data packet is sent to data packet sending module i, and data packet sending module i performs subsequent sending processing.

Data packet sending module 1 receives, through a connected output port of the optical switching unit 120, a data packet sent by the optical switching unit 120, or receives, through a connected output port of the electrical switching unit 130, a data packet sent by the electrical switching unit 130; and sends, through a connected output port of the data switching apparatus 100, a received data packet obtained after optical switching or a received data packet obtained after electrical switching.

It should be noted that the "data frame" according to this embodiment of the present invention includes an IP (Internet Protocol) packet, or includes a MAC (medium access control) frame, a SONET (synchronous optical network) frame, or a data frame that meets another protocol.

Figure 5:
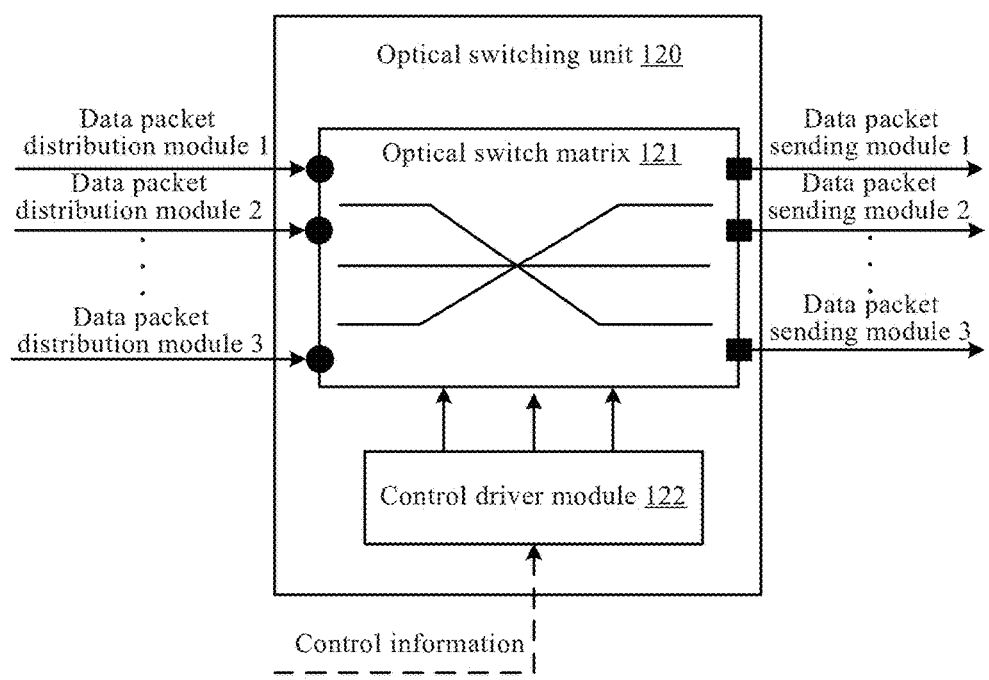
FIG. 5 is a schematic structural diagram of function modules of a data switching apparatus according to an embodiment of the present invention.

For example, the data switching apparatus 100 is a large-capacity core switching apparatus of a data center. N pieces of information that need to be switched respectively enter data packet distribution modules 1 to N from N input ports of the data switching apparatus 100. The N pieces of information may be from a TOR switch, or may be from another network device of the data center, for example, a router or an aggregation switch. Each data packet distribution module completes receiving processing of a data packet for one piece of information that needs to be switched, where the data packet may be a data packet of the Ethernet protocol; a MAC frame is restored from the Ethernet data packet and control information of each MAC frame is extracted, where the control information includes routing information of the data packet, and may further include one or more types of information such as attribute information (a packet length, a protocol type, and the like) of the data packet and priority information of the data packet. The extracted control information is transferred to the central control scheduling module 111 to request path allocation, and after receiving requests of all data packet distribution modules, the central control scheduling module 111 performs analysis and calculation to determine whether the data packet is to be switched by the electrical switching unit 130 or is to be switched by the optical switching unit 120, and transfers this distribution information to a corresponding data packet distribution module. After receiving the distribution information sent by the central control scheduling module 111, the data packet distribution module transfers the MAC frame to an electrical packet switching module or an optical packet switching module according to the distribution information. For the MAC frame sent to the optical switching unit 120, the data packet distribution module re-encapsulates the MAC frame to meet a requirement of the optical switching unit 120. In addition, the central control scheduling module 111 further controls, according to the control information of the data packet, for example, routing information of the data packet, the electrical switching unit 130 and the optical switching unit 120 to perform switching on the data packet distributed to the electrical switching unit 130 or the optical switching unit 120. The electrical switching unit 130 receives a MAC frame from the data packet distribution module through an input port of the electrical switching unit 130, and then forwards the MAC frame to a corresponding output port of the electrical switching unit under control of the central control scheduling module 111. In this embodiment of the present invention, work completed by the electrical switching unit 130 is the same as a function of a switching module in a traditional electrical switch, and details are not described herein again. The optical switching unit 120 receives an optical packet from the data packet distribution module through an input port of the optical switching unit 120, and then forwards the optical packet to a corresponding output port of the optical switching unit 120 under control of the central control scheduling module 111. FIG. 5 shows an implementation method of the optical switching unit 120, and the optical switching unit 120 mainly includes an optical switch matrix 121 and a control driver module 122. The optical switch matrix 121 has N input ports, which are respectively one-to-one corresponding to N data packet distribution modules, and N output ports, which are respectively corresponding to N data packet sending modules. The control driver module 122 receives control information from the central control scheduling module 111, then obtains, by means of calculation according to the control information, information required for adjusting the optical switch matrix 121, and drives status adjustment of an optical switch. Driven by the control driver module 122, the optical switch matrix 121 establishes a link connection relationship between an input port of the optical switch matrix and an output port of the optical switch matrix by adjusting a status of the optical switch, so that a data packet from any input port may be switched to an expected output port. In the solutions of the present invention, because the control information is transmitted in a manner of an electrical signal by the central control scheduling module 111, the optical switching unit 120 does not need to extract the control information from the optical packet. In this way, use of an optical-to-electrical conversion module may be reduced, which reduces energy consumption, and also makes it easy to integrate the optical switching unit 120.

In an implementation manner, the control information that is of the data packet and extracted by the data packet distribution module may include routing information of the data packet and a packet length of the data packet. In this case, as shown in FIG. 4, the central control scheduling module 111 receives the routing information of the data packet and the packet length of the data packet that are sent by the data packet distribution module; if the packet length of the data packet is greater than or equal to a packet length threshold, determines that the distribution information of the data packet indicates that the data packet is to be switched by the optical switching unit 120; or if the packet length of the data packet is less than a packet length threshold, determines that the distribution information of the data packet indicates that the data packet is to be switched by the electrical switching unit 130; sends the distribution information to the data packet distribution module; and controls, according to the routing information of the data packet, the optical switching unit or the electrical switching unit to perform switching on the data packet. The packet length threshold may be set according to a requirement, that is, a longer data packet is sent to the optical switching unit 120 for switching, and a shorter data packet is sent to the electrical switching unit 130 for switching, thereby improving efficiency of data packet switching.

In another implementation manner, the control information of the data packet includes routing information of the data packet and priority information of the data packet. In this case, referring to FIG. 4 and FIG. 6, one data packet distribution module is used as an example to describe function implementation of the central control scheduling module 111.

S501. Receive routing information of a data packet and priority information of the data packet that are sent by data packet distribution module i.

It should be noted that in this embodiment of the present invention, data packet distribution module i is connected to input port i of an optical switching unit.

S502. Determine that an output port that is of an optical switching unit and corresponding to a destination address in the routing information of the data packet is output port j.

There is a correspondence between the destination address in the routing information of the data packet and an output port of a data switching apparatus 100. In an implementation manner, one output port may have a correspondence with one or more destination MAC addresses, and in this case, an output port corresponding to a destination MAC address in the routing information of the data packet may be determined according to the destination MAC address in the routing information of the data packet. In another implementation manner, as shown in Table 1, output port 1 is corresponding to a combination of multiple VLAN ID numbers (a VLAN ID number may be an ID number of a source VLAN of the data packet) and multiple destination MAC addresses. It is assumed that routing information of a data packet includes a VLAN ID number that is 1, and a destination MAC address of the data packet is 00e0.fc00.5518; then, the data packet is corresponding to output port 1.

TABLE 1

Correspondence between an output port number, a destination MAC address, and a V-LAN ID number

| Output port number | VLAN ID number | Destination MAC address |
|---|---|---|
| Output port 1 | 1 | 00e0.fc00.5518 |
| Output port 1 | 2 | 00e0.fc00.5420 |
| Output port 1 | 1 | 00e0.fc10.f620 |
| Output port 1 | 2 | 00e0.fc56.f670 |
| Output port 1 | 2 | 00e0.fc56.f671 |
| Output port 1 | 3 | 00e0.fc56.f672 |

Therefore, the output port that is of the data switching apparatus 100 and corresponding to the destination address in the routing information of the data packet is first determined, and then the output port (it is assumed that the output port is output port j) that is of the optical switching unit 120 and connected to the output port of the data switching apparatus 100 is further determined according to the output port of the data switching apparatus 100, where the output port of the optical switching unit is connected to the output port of the data switching apparatus by using a data packet sending module that is connected to both the output port of the optical switching unit and the output port of the data switching apparatus.

S503. Determine whether output port j of the optical switching unit 120 is idle.

If output port j of the optical switching unit 120 is non-idle, step 506 is performed.

If output port j of the optical switching unit 120 is idle, step 504 is performed.

S504. Determine whether a conflict data packet exists at a current moment.

Requests of the conflict data packet and the data packet arrive at the central control scheduling module 111 at the same time. An input port that is of the optical switching unit and corresponding to the conflict data packet is different from input port i that is of the optical switching unit and corresponding to the data packet, and an output port that is of the optical switching unit and corresponding to the conflict data packet is the same as output port j that is of the optical switching unit and corresponding to the data packet, that is, the conflict data packet and the data packet are data packets that are from different data packet distribution modules i, but destination addresses are data packet sending module j. The input port that is of the optical switching unit and corresponding to the conflict data packet is an input port that is of the optical switching unit and connected to an input port, of the data switching apparatus, corresponding to a source address in routing information of the conflict data packet, and the input port of the data switching apparatus is connected to the input port of the optical switching unit by using a data packet distribution module that is connected to both the input port of the data switching apparatus and the input port of the optical switching unit.

If no conflict data packet exists, step 507 is performed.

If a conflict data packet exists, step 505 is performed.

S505. Determine whether a priority of the data packet is the highest compared with priorities of all conflict data packets.

It is determined, according to the priority information of the data packet, whether the priority of the data packet is higher than the priorities of all the conflict data packets, and if the priority of the data packet is higher than the priorities of all the conflict data packets, step 507 is performed.

S506. Determine that the data packet is to be switched by the electrical switching unit 130.

That is, in this embodiment of the present invention, it is determined that the distribution information of the data packet indicates that the data packet is to be switched by the electrical switching unit.

S507. Determine that the data packet is to be switched by the optical switching unit 120.

That is, in this embodiment of the present invention, it is determined that the distribution information of the data packet indicates that the data packet is to be switched by the optical switching unit.

Figure 6:
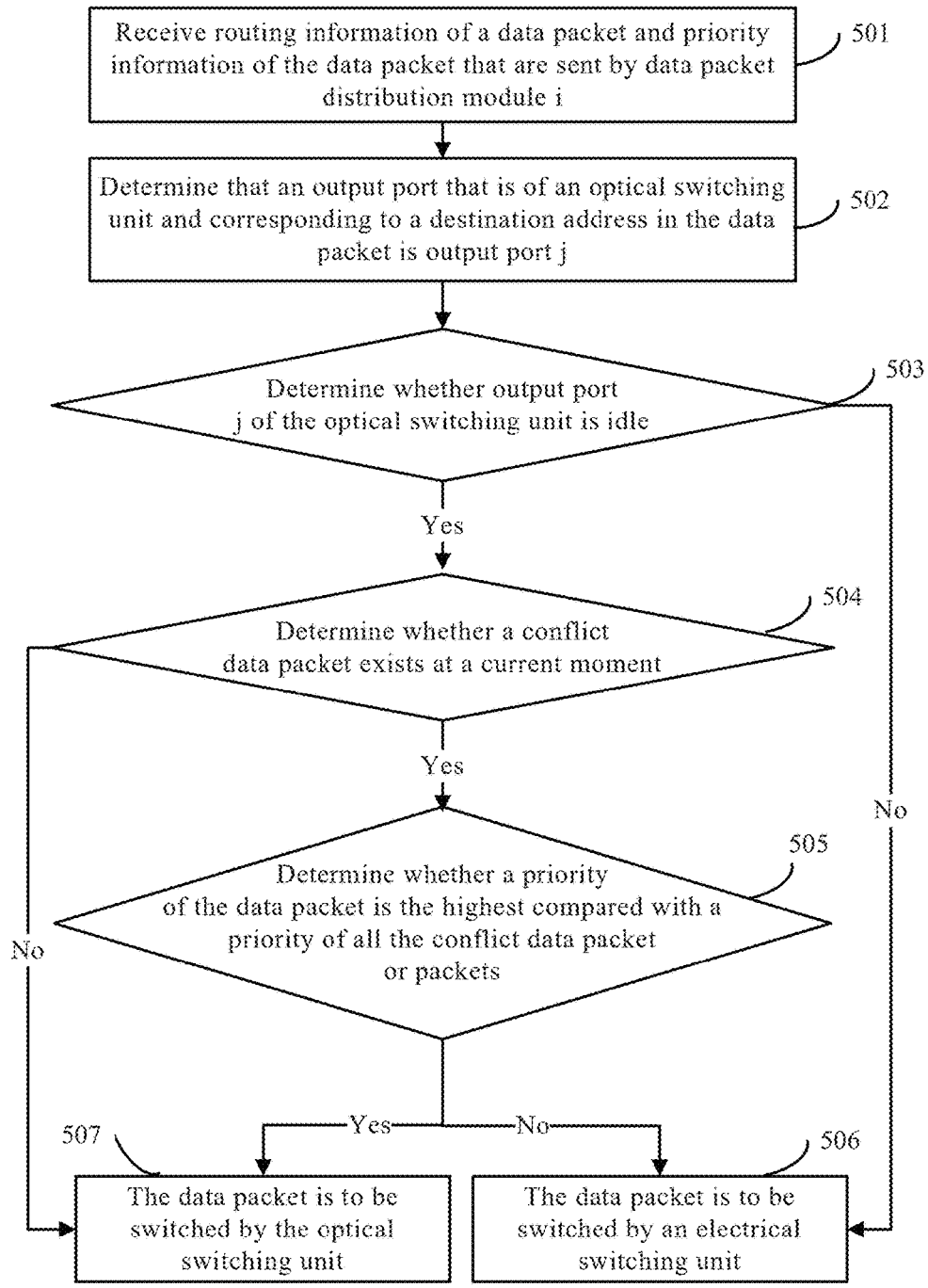
FIG. 6 is a schematic flowchart of a data switching method according to an embodiment of the present invention.

Further, in an implementation manner, as shown in FIG. 6, if a result of the determining in step 505 is that the priority of the data packet is lower than or equal to a priority of any conflict data packet, step 506 is performed. In another implementation manner, if a result of the determining in step 505 is that the priority of the data packet is lower than or equal to a priority of any conflict data packet, the central control scheduling module 111 controls the data packet to wait. A conflict data packet that has a highest priority is sent first, and after a specific time is waited, information about a conflict data packet is re-acquired, it is determined whether the priority of the data packet is the highest, and then a corresponding operation is performed. To avoid occurrence of a condition in which the data packet cannot be sent in a long time, a "waiting" time limit is set. For example, waiting a round needs a time t, and the time limit is set to be 2t, that is, two rounds are waited at most, and after the two rounds are waited, if the priority of the data packet is still not the highest, it is determined that the data packet is to be switched by the electrical switching unit.

After implementing distribution of the data packet in the foregoing manner, the central control scheduling module 111 sends the distribution information to the data packet distribution module, and the data packet distribution module sends the data packet to the optical switching unit 120 or the electrical switching unit 130 according to the distribution information. Then, the central control scheduling module 111 controls, according to the routing information that is of the data packet and previously sent by the data packet distribution module, the optical switching unit or the electrical switching unit to perform switching on the data packet. The routing information may instruct the optical switching unit or the electrical switching unit to switch the data packet to a corresponding output port. For a specific switching manner, reference may be made to FIG. 5 and the description of FIG. 5, and in addition, a person skilled in the art may also implement the switching in another manner according to a requirement, and details are not described herein again.

It can be seen that in this embodiment of the present invention, a central control scheduling module is used to uniformly schedule distribution of a data packet, so that a data packet sent to an optical switching unit is not in conflict, thereby effectively resolving a conflict problem of the optical switching unit.

Figure 7:
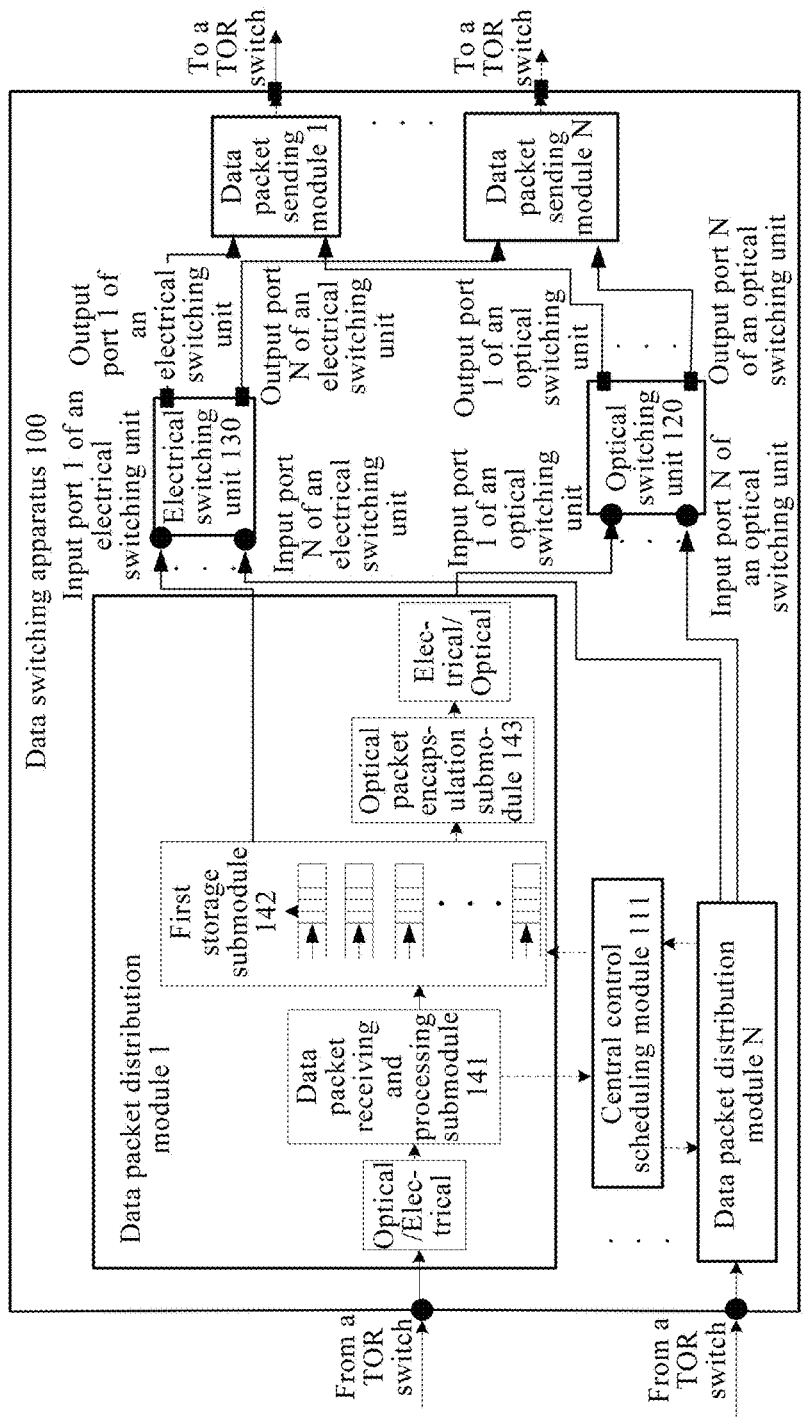
FIG. 7 is a schematic structural diagram of a data switching apparatus according to an embodiment of the present invention.

Further, FIG. 7 is a schematic diagram of a logical structure of a data packet distribution module in a data switching apparatus 100 according to an embodiment of the present invention. It should be noted that FIG. 7 is merely an example of an implementation manner of data packet distribution module 1, and for implementation manners of other data packet distribution modules 2 to N, reference may be made to FIG. 7, or the implementation manners of other data packet distribution modules 2 to N may be another implementation manner that is different from FIG. 7. It is not limited in this embodiment of the present invention to that implementation manners of all data packet distribution modules are consistent.

As shown in FIG. 7, the data switching apparatus 100 includes N input ports and N data packet distribution modules connected to the N input ports, and a central control scheduling module 111 uniformly controls the N data packet distribution modules. Each data packet distribution module has two links, which are respectively connected to an input port of an electrical switching unit 130 and an input port of an optical switching unit 120. The data switching apparatus 100 further includes N output ports and N data packet sending modules connected to the N output ports, and each data packet sending module has two links, which are respectively connected to an output port of the electrical switching unit 130 and an output port of the optical switching unit 120.

Data packet distribution module 1 includes a data packet receiving and processing submodule 141, a first storage submodule 142, and an optical packet encapsulation submodule 143. In FIG. 7, for example, the first storage submodule 142 is a storage array. However, in some other implementation manners of the present invention, the first storage submodule 142 may also implement a cache that has a specific capacity, and the cache is used to temporarily store all or a part of content of a data frame, that is, a data frame to the data packet distribution module may be sent under control of the central control scheduling module 111 almost without a need for storage.

The data packet receiving and processing submodule 141 is configured to: connect an input port (as shown by a circle in the data switching apparatus 110 in the figure) of the data switching apparatus 110, receive a data packet through the connected input port of the data switching apparatus 110, parse out a data frame from the data packet, extract control information of the data frame from the data frame, send the control information to the central control scheduling module, and store the data frame in the first storage submodule 142. Optionally, the first storage submodule 142 may be disposed to include more than one virtual queue, each virtual queue is corresponding to an output port of the data switching apparatus, and a destination address of a data frame stored in the virtual queue is corresponding to the output port of the data switching apparatus. In this way, header-of-line blocking may be effectively prevented.

For example, the received data packet is an Ethernet data packet, and a MAC frame is obtained by parsing the Ethernet data packet. Receiving processing mainly refers to some functions that are of a physical layer and specified in Ethernet standards, for example, block synchronization, 64/66B decoding, and descrambling. Then, control information of the MAC frame is extracted, where the control information includes routing information, the routing information of the MAC frame mainly includes a source MAC address and a destination MAC address, and may further include a V-LAN ID number, and the destination MAC address and the V-LAN ID number may be used to determine a destination port at which the MAC frame is switched to arrive; the control information may further include priority information of the data packet, and when MAC frames in multiple input ports simultaneously request to be switched to a same output port, the central control scheduling module needs to determine and allocate a path according to the priority information.

The central control scheduling module 111 is specifically configured to: receive the control information that is of the data packet and sent by the data packet receiving and processing submodule 141, determine distribution information of the data packet according to the control information, and if the distribution information indicates that the data packet is to be switched by the optical switching unit, instruct the first storage submodule 142 to send the stored data frame of the data packet to the optical packet encapsulation submodule 143.

The optical packet encapsulation submodule 143 is configured to: connect an input port of the optical switching unit 120; and encapsulate the data frame received from the first storage submodule 142 into an optical packet.

The optical packet encapsulation submodule 143 is further configured to: after completing sending a current optical packet, first set a first guard interval, and then send a next optical packet.

Figure 8A:
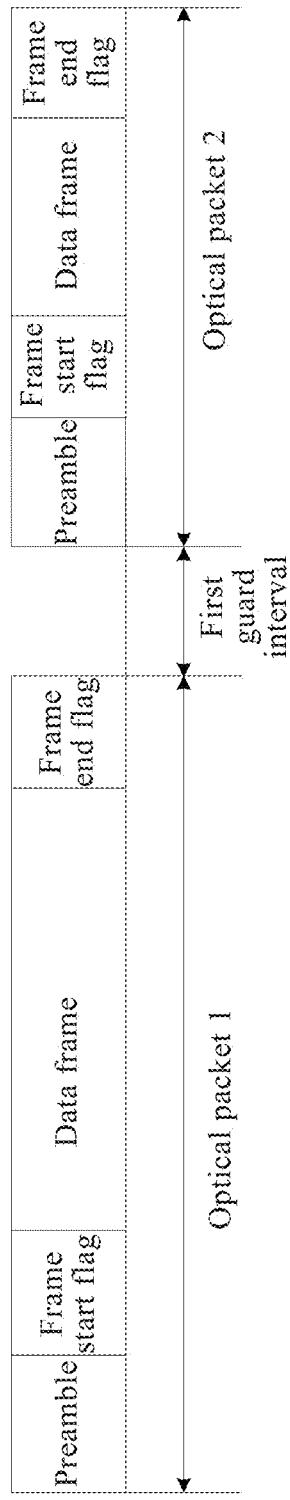
FIG. 8a to FIG. 8c are schematic diagrams of an optical packet structure and a structure between optical packets according to an embodiment of the present invention.

FIG. 8a is a schematic structural diagram of an optical packet according to this embodiment of the present invention. The optical packet includes a preamble, a frame start flag, the data frame, and a frame end flag, and the optical packet is sent to the optical switching unit for switching through the connected input port of the optical switching unit; a length of the preamble is greater than or equal to a quantity of bits that need to be consumed by status adjustment performed by a receiver of the optical packet in order to correctly receive the optical packet. To complete correct receiving of the optical packet, the receiver of the optical packet detects and receives the preamble and extracts information such as optical power and a clock phase of the preamble to adjust a status of the receiver, so as to match a characteristic of the optical packet. The status adjustment mainly includes a threshold adjustment of an amplifier, data clock recovery, and the like.

In an implementation manner, the optical packet encapsulation submodule 143 is further configured to: after completing sending a current optical packet, first set a first guard interval (as shown in FIG. 8a), and then send a next optical packet, where duration of the first guard interval is greater than or equal to a time for performing status adjustment by the optical switching unit before optical switching is performed on the next optical packet.

A MAC frame is used as an example. To ensure that the optical packet can be correctly received after being switched, some preambles need to be first added before the MAC frame, and this preamble is used to perform processing such as a decision threshold adjustment and clock recovery that are of an optical packet receiver. This is because when an optical switch is adjusted, only an extremely small part of optical packet signals can be transmitted to an output port by using the optical switch. In this period of time, an optical packet receiver at a peer end cannot receive an optical packet signal, and in this case, the receiver needs to re-adjust a decision threshold of an internal amplitude limiting amplifier of the receiver; second, after an optical packet switching module performs switching, optical packets outputted by an output port of the optical packet switching module are from different input ports, and a phase difference between optical packets is uncertain. In this case, a clock recovery circuit in the receiver needs to re-extract a synchronization clock from each optical packet, so that correct sampling can be performed on the optical packet. A length of the preamble needs to meet the following: The receiver completes the foregoing described processing and other status adjustment processing, so that the receiver can be adjusted to a suitable status to ensure correct receiving of subsequent data in the optical packet. Third, the optical packet encapsulation submodule 143 further needs to add a frame start flag at a start part of the MAC frame, and add a frame end flag at an end part of the MAC frame, and a location of the MAC frame in a data flow may be located by using the start flag and the end flag. After sending of an optical packet is completed, the optical packet encapsulation submodule 143 then sends a next optical packet after pausing sending data for a period of time, or then sends a next optical packet after sending some idle bits. A time for the pausing the sending or a time occupied by the idle bites is a first guard interval between optical packets. A length of the first guard interval needs to meet an adjustment requirement of an optical switch of an optical switching module. Currently, an adjustment speed of some commercial optical switches needs tens of ns, and therefore, a guard interval between optical packets should be greater than or equal to the time.

In another implementation manner, before instructing the first storage submodule 142 of the data packet distribution module to send a next data frame to the optical packet encapsulation submodule 143, the central control scheduling module 111 determines whether an output port that is of the optical switching unit and corresponding to a destination address in routing information corresponding to the next data frame is the same as an output port that is of an optical packet switching unit and corresponding to the current data frame, and if they are the same, instructs the optical packet encapsulation submodule 143 to send, after completing sending a frame end flag of an optical packet encapsulated from the current data frame, a frame start flag of an optical packet encapsulated from the next data frame, where the optical packet encapsulated from the next data frame includes the frame start flag, the next data frame, and a frame end flag.

In still another implementation manner, before instructing the first storage submodule 142 of the data packet distribution module to send a next data frame to the optical packet encapsulation submodule 143, the central control scheduling module 111 determines whether an output port that is of the optical switching unit and corresponding to a destination address in routing information corresponding to the next data frame is the same as an output port that is of an optical packet switching unit and corresponding to the current data frame, and if they are the same, instructs the optical packet encapsulation submodule 143 to, after completing sending a frame end flag of an optical packet encapsulated from the current data frame, first set a second guard interval, and then send a frame start flag of an optical packet encapsulated from the next data frame, where the optical packet encapsulated from the next data frame includes the frame start flag, the next data frame, and a frame end flag. Preferably, duration of the second guard interval may be less than a time for performing status adjustment by the optical switching unit before optical switching is performed on the optical packet encapsulated from the next data frame.

Figure 8B:
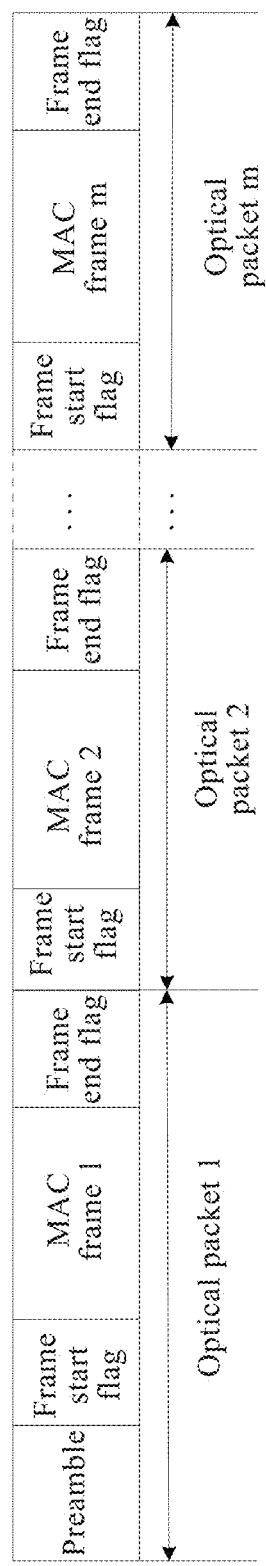
Figure 8C:
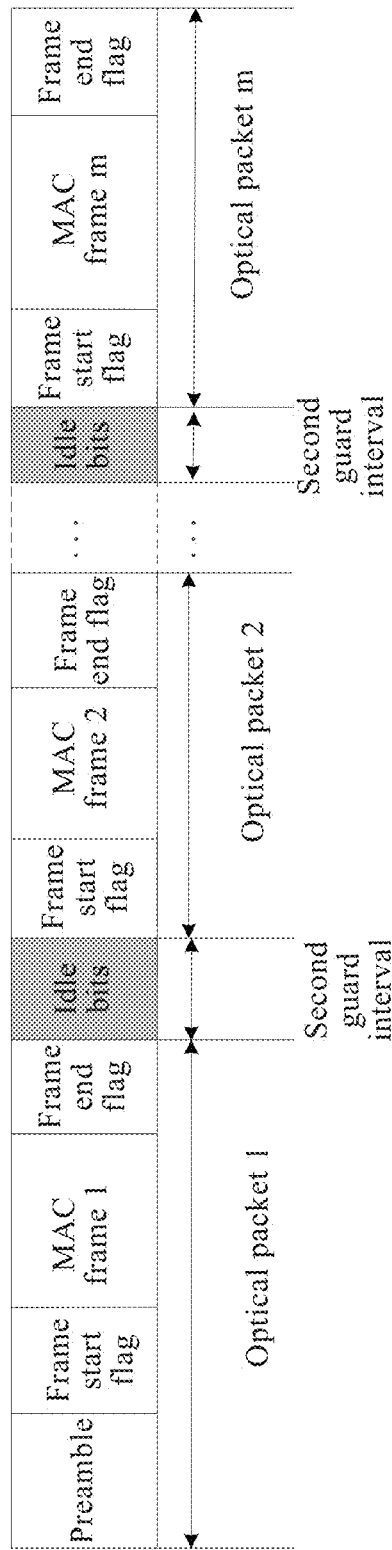

As shown in FIG. 8c, when m (m≥2) consecutive MAC frames need to be switched to a same output port of the optical switching unit, under control of the central control scheduling module 111, these m consecutive MAC frames are encapsulated by the optical packet encapsulation submodule 143 into a data flow format shown in FIG. 8c. Before instructing the first storage submodule 142 to send a next MAC frame to the optical packet encapsulation submodule 143, the central control scheduling module 111 first determines whether the MAC frame to be sent to the optical packet encapsulation submodule 143 and a previous MAC frame arrive at the same output port of the optical switching unit, and if yes, after sending of the frame end flag of the current optical packet is completed, the central control scheduling module 111 instructs the optical packet encapsulation submodule 143 to send idle bits for a length of t1 and use t1 as a second guard interval between optical packets (or no bit is sent for an idle time whose length is t1), and then directly send a frame start flag, a MAC frame, and a frame end flag of a next optical packet; otherwise, the central control scheduling module 111 instructs the optical packet encapsulation submodule 143 to encapsulate the next MAC frame in a form of a preamble, a frame start flag, the MAC frame, and a frame end flag, and after sending of the frame end flag of the current optical packet is completed, send idle bits for a length of t2 and t2 as a first guard interval between optical packets, and then send a preamble, the frame start flag, the MAC frame and the frame end flag (as shown in FIG. 8a) of the next optical packet. The length of t2 mentioned in the foregoing needs to meet a time requirement for adjusting an optical switch. According to a current optical switch technology, the time generally needs be about tens of ns, but the length of t1 does not need to meet the time requirement for adjusting the optical switch, and the time may be extremely short. Generally, data is tens of bits. Therefore, the length of t1 may be less than or equal to t2. In conclusion, if consecutive optical packets that arrive at a same output port appear, under control of the central control scheduling module 111, the optical packet encapsulation submodule 143 adds a preamble to the MAC frame only when encapsulating the first MAC frame into an optical packet, and subsequent m−1 optical packets do not include a preamble; second, a guard interval between optical packets is shortened, the interval does not need to meet the requirement for adjusting the optical switch, and idle bits, that is, invalid bit data may be added to the guard interval.

In another implementation manner, as shown in FIG. 8b, the length of t1 may also be 0, that is, a guard interval is not required between two or more optical packets that are to arrive at the same output port of the optical switching unit.

It should be understood that in this embodiment of the present invention, duration of the first guard interval and the second guard interval is an idle time between the current optical packet and the next optical packet or a time occupied by idle bits between the current optical packet and the next optical packet.

Optical packet formats provided in this embodiment of the present invention can effectively ensure that the optical packet obtained after being switched by using the optical switching unit can be correctly received by a burst receiver. In addition, in the method, provided in this embodiment of the present invention, for controlling optical packet encapsulation by the central control scheduling module, consecutive data frames that arrive at a same destination port may be sent in a form of consecutive data flows, which improves line utilization, thereby improving utilization of an optical packet switching module.

As shown in FIG. 7, data packet distribution module 1 further includes an optical/electrical conversion module and an electrical/optical conversion module. The optical/electrical conversion module is configured to convert a received optical signal into an electrical signal, and may receive an optical signal with a fixed wavelength and may also receive an optical signal with an adjustable wavelength. The electrical/optical conversion module is configured to convert an optical packet into an optical signal and send the optical signal, and may convert the optical packet into an optical signal with a fixed wavelength and may also convert the optical packet into an optical signal with an adjustable wavelength. A data center is used as an example. A signal sent by a TOR switch is an optical signal, and after receiving the optical signal sent by the TOR switch, data packet distribution module 1 first converts the optical signal into an electrical signal. In this case, signals processed by the data packet receiving and processing submodule 141, the first storage submodule 142, the optical packet optical packet encapsulation submodule 143, and the central control scheduling module 111 are all electrical signals, but a signal processed by the optical switching unit 120 provided in this embodiment of the present invention is an optical signal, and therefore, an electrical/optical conversion is performed on an optical packet before the optical packet is sent to the optical switching unit 120. In some implementation manners, for example, a signal from the TOR switch is an electrical signal; then in this case, the optical/electrical conversion module is not mandatory. In some other implementation manners, if the data packet receiving and processing submodule 141, the first storage submodule 142, an optical packet optical packet encapsulation submodule 143, and the central control scheduling module 111 all can process optical signals; then, even if a signal from the TOR switch is an optical signal, both the optical/electrical conversion module and the electrical/optical conversion module are not necessary. An optical/electrical or electrical/optical conversion technology is a known technology in the art, and details are not described in this embodiment of the present invention again.

In the data switching apparatus provided in this embodiment of the present invention, routing information of a data packet is transferred in a form of an electrical signal by a central control scheduling module to an optical switching unit, so that the optical switching unit is controlled to switch the data packet, avoiding generation, insertion, and extraction of an optical packet label in the optical switching unit, and further reducing an optical-to-electrical conversion module and an insertion and extraction circuit that are of an optical packet switching unit. Therefore, energy consumption, complexity, and a cost are reduced.

Figure 9:
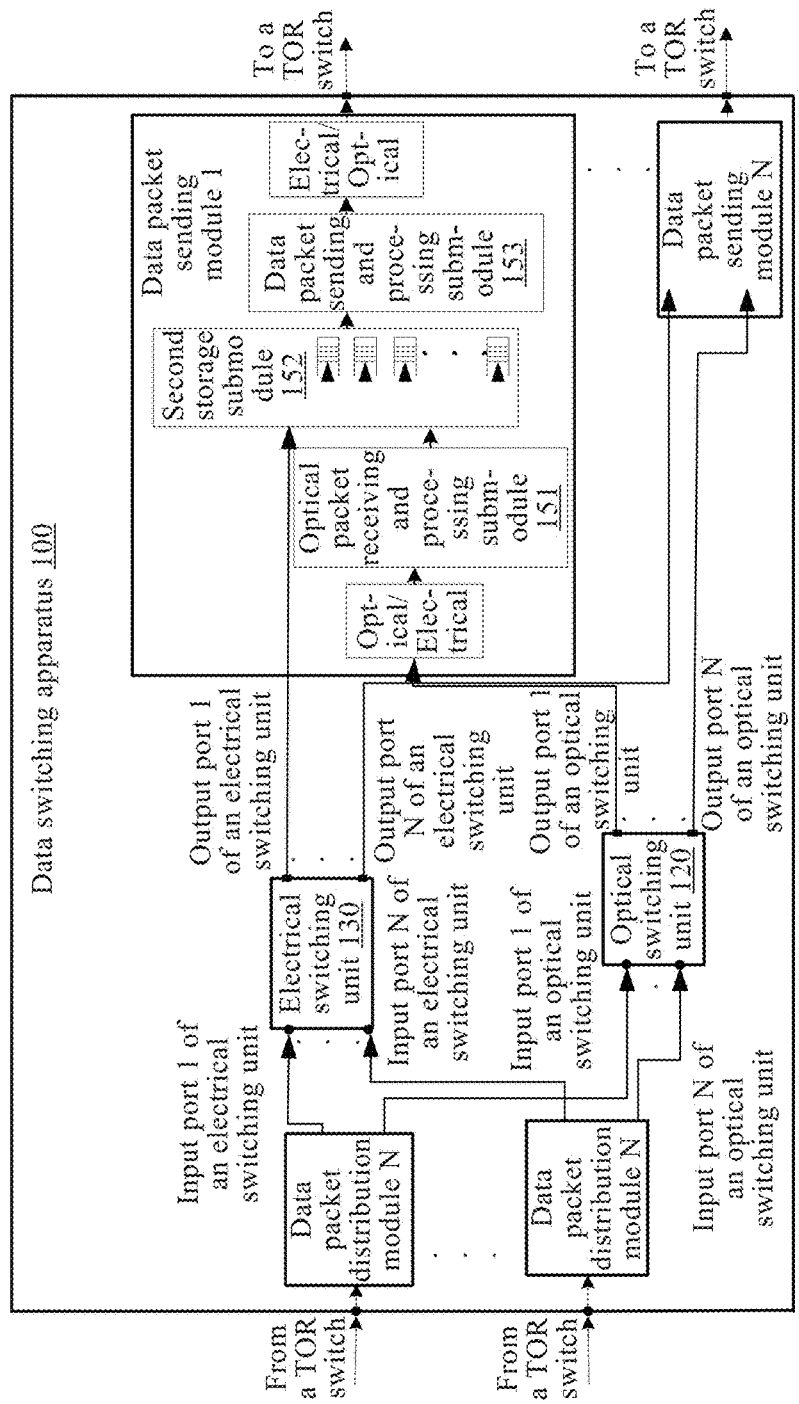
FIG. 9 is a schematic structural diagram of a data switching apparatus according to an embodiment of the present invention.

FIG. 9 is a schematic diagram of a logical structure of a data packet sending module in the data switching apparatus 100 according to an embodiment of the present invention. A connection relationship of internal function modules of the data switching apparatus 100 is similar to that of FIG. 7, and details are not described herein again. As shown in FIG. 9, data packet sending module 1 includes: an optical packet receiving and processing submodule 151, a second storage submodule 152, and a data packet sending and processing submodule 153, and optionally, further includes an optical/electrical conversion module and an electrical/optical conversion module.

The optical packet receiving and processing submodule 151 is configured to: connect an output port of an optical switching unit, receive an optical packet through the connected output port of the optical switching unit, perform status adjustment processing on a data packet from a different input port of the optical switching unit, parse the optical packet to obtain a data frame, and store the data frame in the second storage submodule 152.

In an implementation manner, the second storage submodule 152 includes two virtual queues, where one virtual queue is used to store a data frame sent by the optical packet receiving and processing submodule, and the other virtual queue is used to store a data frame sent by an electrical switching unit.

In another implementation manner, the second storage submodule 152 may include more than one virtual queue, where each virtual queue is corresponding to one input port of the data switching apparatus, and a source address of a data frame stored in the virtual queue is corresponding to the input port of the data switching apparatus.

In another implementation manner, the second storage submodule 152 may also be implemented as a cache. In a case in which a sending processing speed is extremely fast, the data frame may be sent without a need of storage, provided that all or a part of content is properly cached. In addition to storing an optical packet, the second storage submodule 152 may further store a data packet sent by the electrical switching unit 130.

After being switched by using the optical switching unit, optical packets are independent burst packets. This is because each optical packet is from a different data packet distribution module, and phase deviation, clock jitter, and optical power between packets are different. The optical packet receiving and processing submodule 151 needs to perform status adjustment processing, such as clock extraction, data restoration, and frame synchronization, on each optical packet.

The data packet sending and processing submodule 153 is configured to: connect an output port of the data switching apparatus 100; acquire the data frame stored in the second storage submodule 152, encapsulate the data frame into a data packet, where the data packet is a data packet that complies with an actual transmission format in a physical link; and send the data packet through the connected output port of the data switching apparatus. A MAC frame is used as an example. The data packet sending and processing submodule 153 encapsulates a MAC frame acquired from the second storage submodule 152 into an Ethernet data packet that complies with the Ethernet protocol, and then sends the data packet to a TOR switch. An encapsulation process mainly refers to some operations on a physical layer specified in Ethernet standards, for example, 64/66B coding and scrambling.

In the data packet sending module, a simple "first in first out" principle may be used to send a data packet, and certainly, a polling (data frames from the optical switching unit and the electrical switching unit are sent in turn) principle, or a more complex control mechanism may be used. The control mechanism may use an independent control module, or the function may be integrated into the central control scheduling module 111.

The data switching apparatus provided in this embodiment of the present invention may be applied to an existing Ethernet data center system. First, data from a TOR switch or another network device is processed first, an Ethernet data packet is processed into an optical packet that meets a requirement of an optical switching unit, inverse processing is then performed on an optical packet obtained after switching to restore a MAC frame, and finally the MAC frame is processed according to an Ethernet protocol and transferred to the TOR switch or the another network device, so that the existing data center can be smoothly upgraded.

Figure 10:
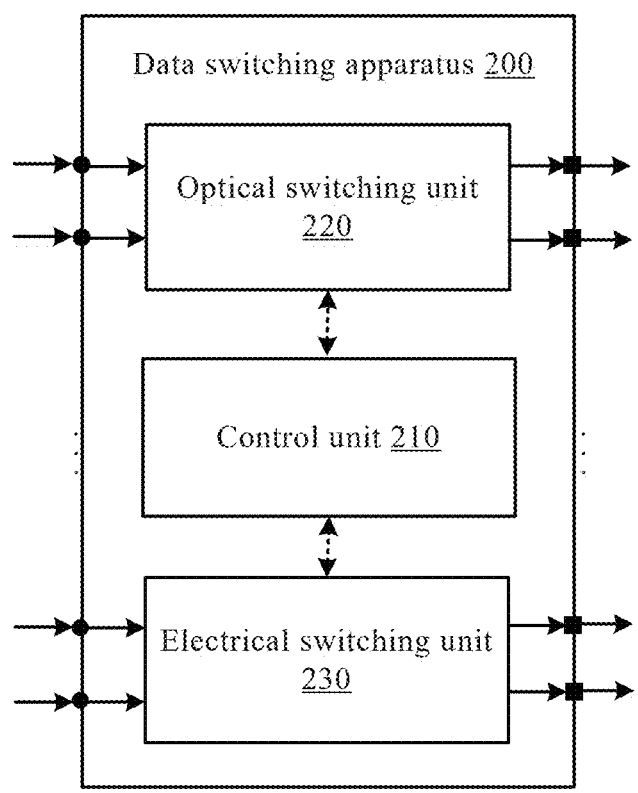
FIG. 10 and FIG. 11 are schematic structural diagrams of another data switching apparatus according to an embodiment of the present invention.

Referring to FIG. 10, an embodiment of the present invention further provides another data switching apparatus. The another data switching apparatus 200 includes more than one input port (as shown by circles), more than one output port (as shown by squares), an electrical switching unit 230, an optical switching unit 220, and a control unit 210.

The electrical switching unit 230 is connected to an input port and an output port of the data switching apparatus 200 so as to: receive a data packet through the connected input port of the data switching apparatus 200, extract control information from the data packet, and send the control information to the control unit 210; the electrical switching unit 230 is configured to: perform electrical switching on the data packet under control implemented by the control unit 210 according to the control information, and send a data packet obtained after the switching through the connected output port of the data switching apparatus 200.

The optical switching unit 220 is connected to an input port and an output port of the data switching apparatus 200, so as to: receive a data packet through the connected input port of the data switching apparatus 200, extract control information from the data packet, and send the control information to the control unit; the optical switching unit 220 is configured to perform optical switching on the data packet under control implemented by the control unit according to the control information, and send a data packet obtained after the switching through the connected output port of the data switching apparatus.

The control unit 210 is configured to: receive the control information that is of the data packet and sent by the electrical switching unit 230 or the optical switching unit 220, and control, according to the control information, the electrical switching unit 230 or the optical switching unit 220 to perform switching on the data packet.

Preferably, in this embodiment of the present invention, the control information of the data packet includes at least routing information of the data packet, that is, the control unit 210 controls, according to the at least routing information of the data packet, the electrical switching unit 230 or the optical switching unit 220 to perform switching on the data packet.

Figure 11:
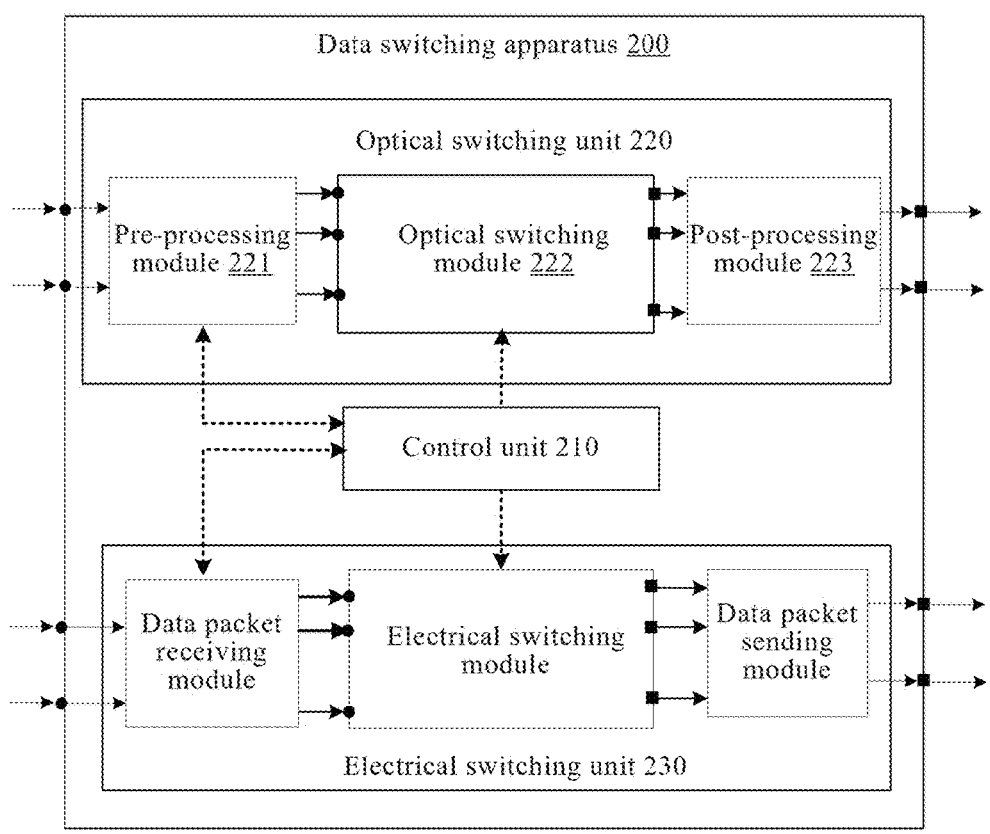

Further, as shown in FIG. 11, the optical switching unit 220 includes a pre-processing module 221, a post-processing module 223, and an optical switching module 222.

The pre-processing module 221 is configured to: connect one or more than one input port of the data switching apparatus 200; receive a data packet through the connected input port of the data switching apparatus 200, extract control information and a data frame from the data packet, send the control information to the control unit 210, encapsulate the data frame into an optical packet, and send the optical packet to the optical switching module 222.

The optical switching module 222 includes more than one input port and more than one output port and is configured to: receive, through the input port, the optical packet sent by the pre-processing module 221, perform optical switching on the optical packet under control implemented by the control unit 210 according to the control information, and send an optical packet obtained after the switching to the post-processing module 223 through the output port.

The post-processing module 223 is configured to: connect one or more than one output port of the data switching apparatus; receive the optical packet sent by the optical switching module 222 through the output port of the optical switching module 222, extract a data frame from the optical packet, encapsulate the data frame into a data packet, and send the data packet through a connected output port of the data switching apparatus 222.

It should be noted that functions of the pre-processing module 221 and the post-processing module 223 in this embodiment of the present invention may be implemented by using one physically independent module, or may be implemented by using multiple physically separate modules. For example, the optical switching module 222 includes N input ports and N output ports, and in this case, the data switching apparatus 200 may include N pre-processing modules and N post-processing modules, which are respectively connected to the N input ports and the N output ports of the optical switching module 222. The N pre-processing modules and the N post-processing modules are further respectively connected to N output links of another network device, such as a TOR switch, and N input links of the another network device.

Specifically, the pre-processing module 211 may include a first submodule, a second submodule, and a third submodule. The first submodule receives the data packet through the connected input port of the data switching apparatus 200, extracts the control information and the data frame in the data packet, sends the control information to the control unit 210, and stores the data frame in the third submodule; the second submodule is configured to extract the data frame from the third submodule, encapsulate the data frame into an optical packet, and send the optical packet to the optical switching module 222 through the connected input port of the optical switching module 222. A structure of the optical packet may be the structure shown in any one of FIG. 8a to FIG. 8c.

Specifically, the post-processing module 223 may include a fourth submodule, a fifth submodule, and a sixth submodule. The fourth submodule receives the optical packet through the connected output port of the optical switching module 222, extracts the data frame in the optical packet, encapsulates the data frame into a data packet, and sends the data packet through the connected output port of the data switching apparatus 200. The encapsulation process herein may be performing encapsulation on the data frame according to a transmission protocol.

In an implementation manner, after completing sending a current optical packet, the pre-processing module 221 first sets a first guard interval, and then sends a next optical packet, where duration of the first guard interval is greater than or equal to a time for performing status adjustment by the optical switching unit before optical switching is performed on the next optical packet. Both the two optical packets include a preamble, a frame start flag, a data frame, and a frame end flag.

In another implementation manner, the control unit 210 is configured to: determine whether an output port that is of the optical switching unit and corresponding to a destination address in routing information corresponding to a next to-be-sent optical packet is the same as an output port that is of an optical packet switching unit and corresponding to a previous optical packet, and if they are the same, instruct the pre-processing module 221 to, after completing sending the previous optical packet, directly send a frame start flag of the next to-be-sent optical packet. Because the two optical packets are consecutively sent to a same destination address, a guard interval and a preamble may not be set in the sending interval.

In still another implementation manner, the control unit 210 is configured to: determine whether an output port that is of the optical switching unit and corresponding to a destination address in routing information corresponding to a next to-be-sent optical packet is the same as an output port that is of an optical packet switching unit and corresponding to a previous optical packet, and if they are the same, instruct the pre-processing module 221 to, after completing sending the previous optical packet, send a second guard interval, and then send a frame start flag of the next to-be-sent optical packet. Preferably, duration of the second guard interval is less than a time for performing status adjustment by the optical switching unit before optical switching is performed on the next to-be-sent optical packet. In this case, because the two optical packets are consecutively sent to a same destination address, a preamble may not be set and a guard interval may be set, but duration of the guard interval may be relatively small.

As shown in FIG. 11, the electrical switching unit 230 includes a data packet receiving module, an electrical switching module, and a data packet sending module.

The data packet receiving module is configured to: connect one or more input ports of the data switching apparatus 200, receive a data packet through the connected input port of the data switching apparatus 200, extract control information from the data packet, send the control information to the control unit 210, and send the data packet to the electrical switching module.

The electrical switching module is configured to receive the data packet sent by the data packet receiving module, perform electrical switching on the data packet under control implemented by the control unit 210 according to the control information of the data packet, and send a data packet obtained after the switching to the data packet sending module.

The data packet sending module is configured to: connect one or more output ports of the data switching apparatus 200, receive the data packet sent by the electrical switching module, and send the data packet through the connected output port of the data switching apparatus 200.

Implementation of the data packet receiving module and implementation of the data packet sending module are similar to the foregoing pre-processing module 221 and the post-processing module 223, which may be a physically independent module, or may be multiple physically separate modules. Specific function implementation is similar to electrical switching in the prior art, or reference may be also made to the implementation in the foregoing embodiment, and details are not described herein again.

In the foregoing embodiment, although the data switching apparatus 200 has both an electrical switching function and an optical switching function, the data switching apparatus 200 does not have a data packet allocation function, and implementation of data packet allocation is implemented by a network device connected to the data switching apparatus 200.

Figure 12:
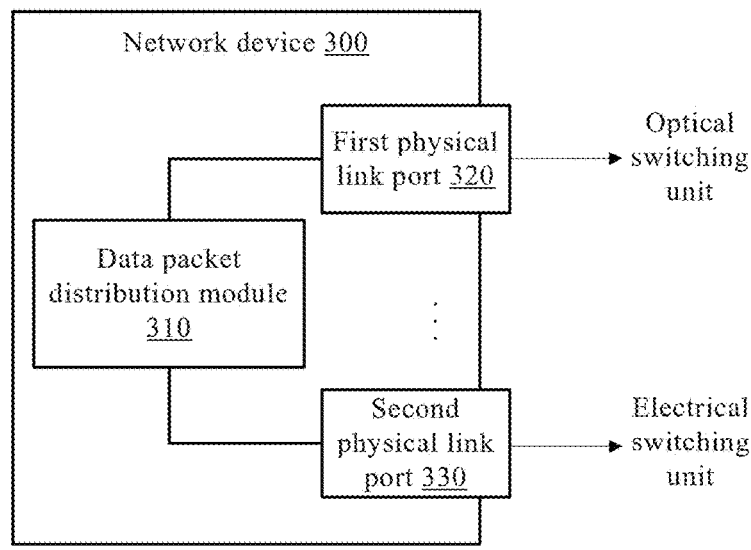
FIG. 12 is a schematic structural diagram of a network device according to an embodiment of the present invention.

Accordingly, as shown in FIG. 12, an embodiment of the present invention provides a network device. The network device may be connected to the data switching apparatus shown in FIG. 10 or FIG. 11, so as to implement data switching and data communication. The network device may be a TOR switch, an aggregation switch, a router, or another network device. The network device 300 includes at least one first physical link port 320, at least one second physical link port 330, and a data packet distribution module 310.

The data packet distribution module 310 is configured to distribute a received data packet to the first physical link port 320 or the second physical link port 330; send the data packet by using a first physical link connected to the first physical link port 320, so that optical switching is performed by a receiver on the data packet; and send the data packet by using a second physical link connected to the second physical link port 330, so that electrical switching is performed by the receiver on the data packet.

FIG. 12 is used as an example. The data packet distribution module 310 distributes received data packets according to a distribution policy, where some data packets are distributed to the first physical link port 320, and some data packets are distributed to the second physical link port 330; the two ports are respectively connected to two physical links, and the two physical links are respectively connected to an optical switching unit and an electrical switching unit that are of the data switching apparatus provided in this embodiment of the present invention.

In an implementation manner, the data packet distribution module 310 may use the packet length policy described in the foregoing embodiment for a distribution policy of the data packets. Specifically, if a packet length of the received data packet is greater than or equal to a packet length threshold, the data packet is distributed to the first physical link port so as to send the data packet by using the first physical link connected to the first physical link port, so that optical switching is performed by the receiver on the data packet; otherwise, the data packet is distributed to the second physical link port so as to send the data packet by using the second physical link connected to the second physical link port, so that electrical switching is performed by the receiver on the data packet. That is, optical switching is performed on a data packet that has a longer packet length, and electrical switching is performed on a data packet that has a shorter packet length.

In another implementation manner, the data packet distribution module 310 may also use the conflict data packet detection policy described in the foregoing embodiment. Before a conflict data packet is detected, it is required to acquire a port usage condition of the optical switching unit in the data switching apparatus. For specific implementation, reference may be made to the description of the foregoing embodiment or the method embodiment.

Certainly, the network device 300 shown in FIG. 12 may further include one or more input ports, configured to receive a data packet sent by another network device.

Figure 13:
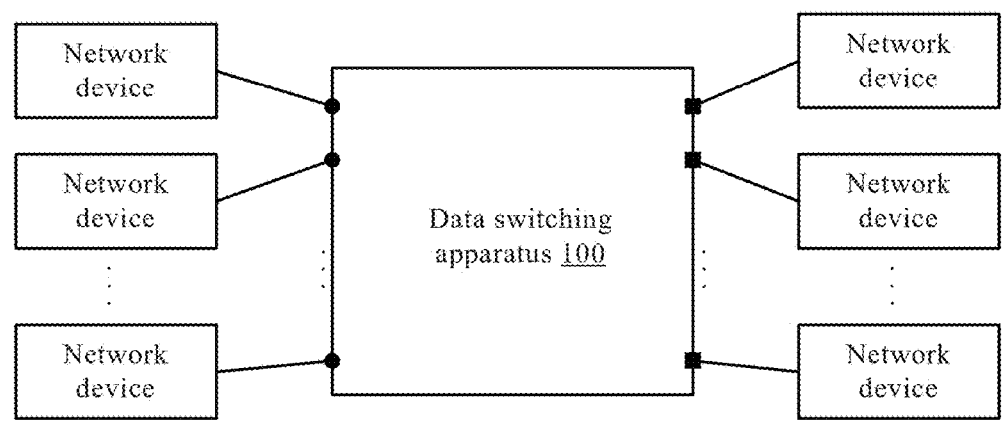
FIG. 13 is a schematic structural diagram of a network system according to an embodiment of the present invention.

FIG. 13 is a schematic diagram of a logical structure of a data switching system according to an embodiment of the present invention. The system includes multiple network devices and a data switching apparatus 100.

The network devices may be the same or may be different, and may be a TOR switch, an aggregation switch, a router, and the like existing in the prior art. The network device is connected to an input port of the data switching apparatus 100, and the network device sends a data packet to the data switching apparatus 100 through the connected input port of the data switching apparatus 100. The network device and the input port of the data switching apparatus 100 may be in a one-to-one, multiple-to-one, or one-to-multiple connection relationship. Generally, when connecting to a same input port of the data switching apparatus, the multiple network devices need to connect to a multiplexer before connecting to the input port, the multiple network devices are connected to the same input port by using the multiplexer, and the data switching apparatus includes a corresponding demultiplexer.

The data switching apparatus 100 is configured to receive the data packet from the network device through the input port of the data switching apparatus, and send, to another network device through an output port of the data switching apparatus 100, a data packet obtained after electrical switching or optical switching is performed on the data packet.

For specific function division and implementation of the data switching apparatus 100, reference may be made to the description of the apparatus embodiment or the method embodiment.

Figure 14:
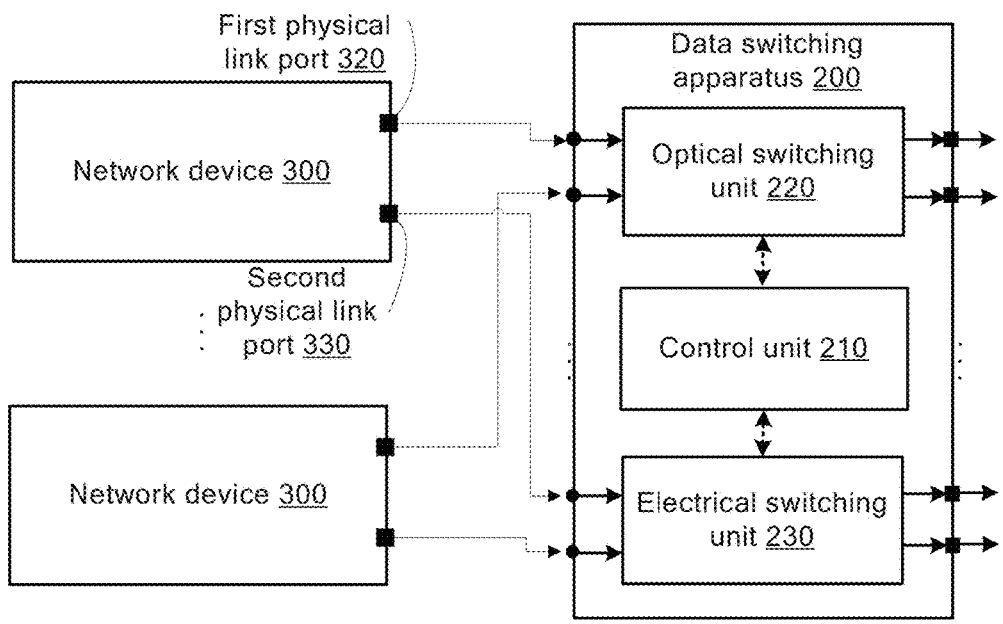
FIG. 14 is a schematic structural diagram of another network system according to an embodiment of the present invention.

FIG. 14 is a schematic diagram of a logical structure of another data switching system according to an embodiment of the present invention. The system includes multiple network devices 300 and a data switching apparatus 200. A first physical link port 320 of the network device 300 is connected to an input port of the data switching apparatus 200 by using a first physical link; a second physical link port 330 of the network device 300 is connected to another input port of the data switching apparatus 200 by using a second physical link.

The network device 300 is configured to send a data packet to the data switching apparatus 200 by using the first physical link and the connected input port of the data switching apparatus 200, so that the data switching apparatus 200 performs optical switching on the data packet; and send a data packet to the data switching apparatus by using the second physical link and the connected input port of the data switching apparatus, so that the data switching apparatus 200 performs electrical switching on the data packet.

For function division and specific implementation of the network device 300 and the data switching apparatus 200, reference may be made to the description of the apparatus embodiment or the method embodiment.

Figure 15A:
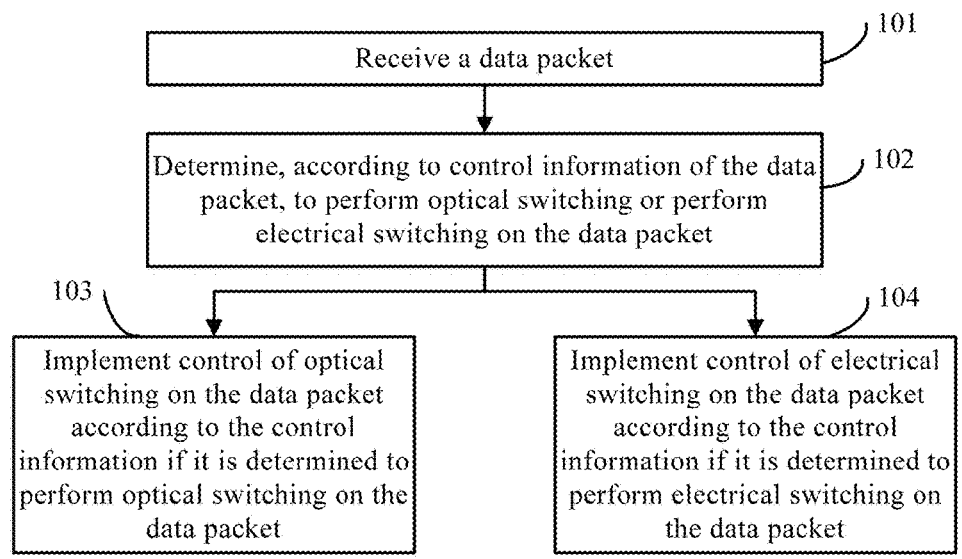
FIG. 15a and FIG. 15b are schematic flowcharts of a data scheduling method according to an embodiment of the present invention.

FIG. 15*a* is a data scheduling method according to an embodiment of the present invention. The method may be applied to a core data switching apparatus, an aggregation switch, a TOR switch, a router or another network device in a data center. The method may be applied to the data switching apparatus 100, the data switching apparatus 200 or the network device 300 provided in the embodiments of the present invention. As shown in FIG. 15*a*, the method includes:

S101. Receive a data packet, where the data packet carries control information.

Specifically, the control information may include attribute information of the data packet and routing information of the data packet, and it is determined, according to one or two types of the attribute information of the data packet or the routing information of the data packet, whether to perform optical switching or perform electrical switching on the data packet. If it is determined to perform optical switching, optical switching is controlled, according to the routing information of the data packet, to be performed on the data packet; if it is determined to perform electrical switching, electrical switching is controlled, according to the routing information of the data packet, to be performed on the data packet.

The attribute information of the data packet is attribute information such as a length of the data packet and a priority of the data packet; the routing information of the data packet is routing-related information such as a source address and/or a destination address carried in the data packet.

S102. Determine, according to the control information, whether to perform optical switching or perform electrical switching on the data packet.

S103. Implement control of optical switching on the data packet according to the control information if it is determined to perform optical switching on the data packet.

Specifically, if it is determined to perform optical switching on the data packet, an optical switching unit is controlled according to the control information to perform optical switching on the data packet. A person skilled in the art may understand that, the optical switching herein may be performed on an optical packet corresponding to the data packet, that is, if the data packet is an optical packet, optical switching may be performed directly on the optical packet, or if the data packet is not an optical packet, the data packet may be converted into an optical packet, and then optical switching is performed on the data packet that is converted into the optical packet.

S104. Implement control of electrical switching on the data packet according to the control information if it is determined to perform electrical switching on the data packet.

Specifically, if it is determined to perform electrical switching on the data packet, an electrical switching unit is controlled according to the control information to perform electrical switching on the data packet.

A person skilled in the art may understand that, the electrical switching herein may be performed on an electrical packet corresponding to the data packet, that is, if the data packet is an electrical packet, electrical switching may be performed directly on the electrical packet, or if the data packet is not an electrical packet, the data packet may be converted into an electrical packet, and then electrical switching is performed on the data packet that is converted into the electrical packet.

Figure 15B:
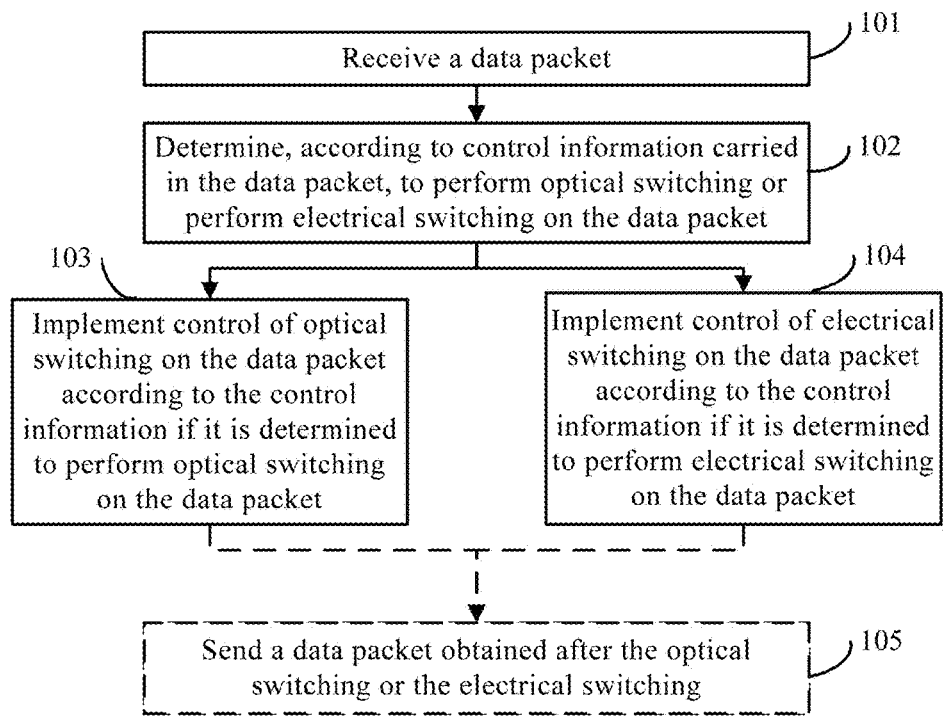

Further, as shown in FIG. 15*b*, the method may further include:

S105. Send a data packet obtained after the optical switching or the electrical switching, where the optical switching and the electrical switching are completed under control implemented according to the control information.

Specifically, the data packet obtained after the optical switching or the electrical switching is sent to another network device that has a communication contact with the network device to which the method is applied.

In an implementation manner, the control information includes routing information of the data packet and a packet length of the data packet. Step S102 includes: if the packet length of the data packet is greater than or equal to a packet length threshold, determining to perform optical switching on the data packet, or if the packet length of the data packet is less than a packet length threshold, determining to perform electrical switching on the data packet. Then, control of optical switching or electrical switching on the data packet is implemented according to the routing information of the data packet.

The packet length threshold may be set according to an actual specific data switching condition and a requirement by a person skilled in the art. In another implementation manner, the control information includes routing information of the data packet and priority information of the data packet. Step S102 includes (reference may be made to FIG. 6): determining an output port that is of the optical switching unit and corresponding to a destination address in the routing information of the data packet, where the optical switching unit is configured to perform optical switching on the data packet; if the output port that is of the optical switching unit and corresponding to the data packet is non-idle, determining to perform electrical switching on the data packet; or if the output port that is of the optical switching unit and corresponding to the data packet is idle, determining whether a conflict data packet currently exists, where an input port that is of the optical switching unit and corresponding to the conflict data packet is different from an input port that is of the optical switching unit and corresponding to the data packet, an output port that is of the optical switching unit and corresponding to the conflict data packet is the same as the output port that is of the optical switching unit and corresponding to the data packet, and the input port that is of the optical switching unit and corresponding to the conflict data packet is an input port that is of the optical switching unit and corresponding to a source address in routing information of the conflict data packet.

If the conflict data packet does not exist, it is determined to perform optical switching on the data packet.

If a conflict data packet exists, it is determined, according to the priority information of the data packet, whether a priority of the data packet is higher than priorities of all conflict data packets, and if the priority of the data packet is higher than the priorities of all the conflict data packets, it is determined to perform optical switching on the data packet. Further, if the priority of the data packet is lower than or equal to a priority of any one conflict data packet, it is determined to perform electrical switching on the data packet. Then, control of optical switching or electrical switching on the data packet is implemented according to the routing information of the data packet.

In some other implementation manners, if the priority of the data packet is lower than or equal to a priority of any one conflict data packet, the data packet is controlled to wait.

Further, if the received data packet meets a requirement for optical packet switching, after the step of determining to perform optical switching on the data packet, the method further includes: extracting a data frame from the data packet, encapsulating the data frame into an optical packet, and implementing control of optical switching on the optical packet according to the control information.

The optical packet in this embodiment of the present invention may include a preamble, a frame start flag, the data frame, and a frame end flag, and duration of the preamble is greater than or equal to a time for performing status adjustment by a receiver of the optical packet on the optical packet; or in some cases, the optical packet in this embodiment of the present invention may not include a preamble.

In an implementation manner, the method further includes: before control of optical switching on a next optical packet of the optical packet is implemented, setting a first guard interval after the frame end flag of the optical packet and before a preamble of the next optical packet, where duration of the first guard interval is greater than or equal to a time for performing status adjustment by the optical switching unit before optical switching is performed on the next optical packet. Referring to FIG. 8*a*, in this case, optical packets all include a preamble.

In another implementation manner, before the data frame is encapsulated into the optical packet, the method further includes: determining whether an output port that is of the optical switching unit and corresponding to the data frame in the data packet is consistent with an output port that is of the optical switching unit and corresponding to a data frame in a previous data packet, and if they are consistent, encapsulating the data frame in the data packet into the optical packet, where the optical packet includes a frame start flag, the current data frame, and a frame end flag. Referring to FIG. 8*b*, output ports that are of the optical switching unit and corresponding to m (m≥2) consecutive optical packets are the same; then, only the first optical packet is encapsulated with a preamble during encapsulation, and a subsequent optical packet does not include a preamble.

Further, the method further includes: before control of optical switching on the optical packet encapsulated from the data frame in the data packet is implemented, setting a second guard interval after a frame end flag of an optical packet encapsulated from the data frame in the previous data packet and before the frame start flag of the optical packet encapsulated from the data frame in the data packet. As shown in FIG. 8*c*, a second guard interval may further be set between the m consecutive optical packets that are encapsulated from MAC frames and are sent to a same output port of the optical switching unit. Preferably, duration of the second guard interval is less than a time for performing status adjustment by the optical switching unit before optical switching is performed on the optical packet encapsulated from the data frame in the data packet.

In this way, multiple optical packets that are consecutively sent to the same output port may be used as a data flow for sending (refer to FIG. 8*b* and FIG. 8*c*). Only the first optical packet in the data flow has a preamble, and because the optical switching unit does not need to perform a switch adjustment when sending these optical packets, a guard interval between the optical packets may be less than the time for performing status adjustment by the optical switching unit.

It should be noted that, the data scheduling method provided in this embodiment of the present invention may further include functions in the foregoing apparatus embodiment such as data packet processing, data packet storage, and optical packet encapsulation. For specific implementation, reference may be made to the description of the foregoing apparatus or system embodiment.

It can be seen that in the data scheduling method provided in this embodiment of the present invention, a data packet is received, and it is determined, according to control information carried in the data packet, whether to perform optical switching or perform electrical switching on the data packet; control of optical switching on the data packet is implemented according to the control information if it is determined to perform optical switching on the data packet; or control of electrical switching on the data packet is implemented according to the control information if it is determined to perform electrical switching on the data packet, which implements an effective combination of an electrical switching technology and an optical switching technology. The data packet may be switched by using an electrical switching unit or may be switched by using an optical switching unit, thereby effectively improving efficiency of data switching and better scheduling an optical switching resource and an electrical switching resource in a comprehensive manner.

Figure 16A:
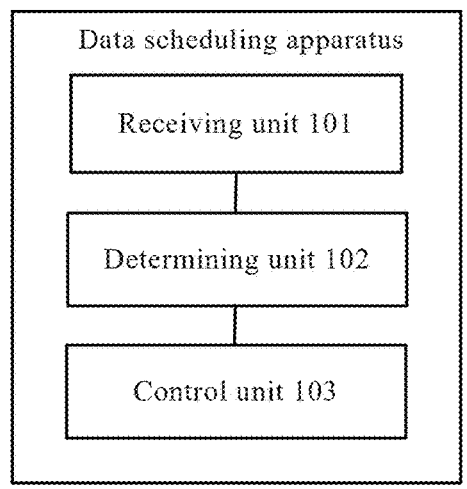
FIG. 16a to FIG. 16c are schematic structural diagrams of a data scheduling apparatus according to an embodiment of the present invention.

Referring to FIG. 16*a*, FIG. 16*a* is a data scheduling apparatus according to an embodiment of the present invention. The apparatus may exist independently or may be deployed in a data switching apparatus. As shown in FIG. 16*a*, the apparatus includes a receiving unit 101, a determining unit 102, and a control unit 103. The receiving unit 101 is configured to receive a data packet, and send the data packet to the determining unit 102. The determining unit 102 is configured to receive the data packet sent by the receiving unit 101, where the data packet carries control information; and determine, according to the control information, whether optical switching or electrical switching is to be performed on the data packet. The control unit 103 is configured to: implement control of optical switching on the data packet according to the control information if it is determined to perform optical switching on the data packet; or implement control of electrical switching on the data packet according to the control information if it is determined to perform electrical switching on the data packet.

It should be noted that unit division provided in this embodiment of the present invention is merely exemplary. For example, the determining unit 102 and the control unit 103 may be implemented as two independent units, or may be combined into one unit.

Figure 16B:
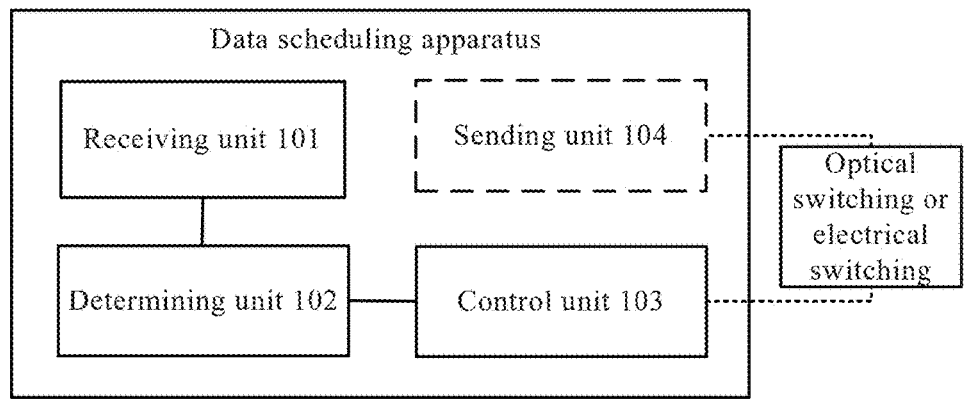

Further, as shown in FIG. 16*b*, the apparatus may further include a sending unit 104, configured to send a data packet obtained after the optical switching or the electrical switching, where the optical switching and the electrical switching are completed under control implemented by the control unit according to the control information.

Figure 16C:
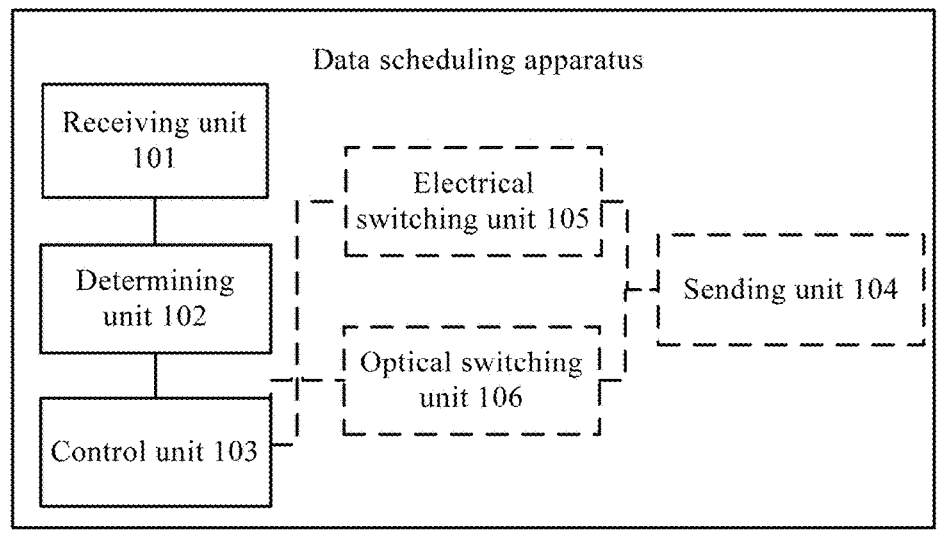

Further, as shown in FIG. 16*c*, the apparatus may further include: an electrical switching unit 105, configured to perform electrical switching on the data packet; where the control unit 103 is specifically configured to: if it is determined to perform electrical switching on the data packet, control, according to the control information, the electrical switching unit to perform electrical switching on the data packet; and an optical switching unit 106, configured to perform optical switching on the data packet; where the control unit 103 is specifically configured to: if it is determined to perform optical switching on the data packet, control, according to the control information, the optical switching unit to perform optical switching on the data packet.

In an implementation manner, the electrical switching unit 105 and the optical switching unit 106 may further send the data packet obtained after the switching to the sending unit 104, and the sending unit 104 sends the data packet obtained after the switching to another network device that has a communication relationship with the data scheduling apparatus. In another implementation manner, the electrical switching unit 105 and the optical switching unit 106 may send the data packet obtained after the switching directly to another network device that has a communication relationship with the data scheduling apparatus.

It should be noted that both the electrical switching unit 105 and the optical switching unit 106 may be deployed in the data scheduling apparatus provided in this embodiment of the present invention, or only one unit may be deployed in the data scheduling apparatus provided in this embodiment of the present invention and the other unit may be deployed in another apparatus that has a communication contact with the data scheduling apparatus provided in this embodiment of the present invention.

In an implementation manner, the control information includes routing information of the data packet and a packet length of the data packet. The determining unit 102 is specifically configured to: if the packet length of the data packet is greater than or equal to a packet length threshold, determine that optical switching is to be performed on the data packet; or if the packet length of the data packet is less than a packet length threshold, determine that electrical switching is to be performed on the data packet. In another implementation manner, the control information includes routing information of the data packet and priority information of the data packet.

The determining unit 102 is specifically configured to: determine an output port that is of the optical switching unit and corresponding to a destination address carried in the routing information of the data packet, where the optical switching unit is configured to perform optical switching on the data packet; and if the determined output port that is of the optical switching unit and corresponding to the data packet is non-idle, determine that electrical switching is to be performed on the data packet; or if the determined output port that is of the optical switching unit and corresponding to the data packet is idle, determine whether a conflict data packet currently exists, where an input port that is of the optical switching unit and corresponding to the conflict data packet is different from an input port that is of the optical switching unit and corresponding to the data packet, an output port that is of the optical switching unit and corresponding to the conflict data packet is the same as the output port that is of the optical switching unit and corresponding to the data packet, and the input port that is of the optical switching unit and corresponding to the conflict data packet is an input port that is of the optical switching unit and corresponding to a source address in routing information of the conflict data packet; where if the conflict data packet does not exist, it is determined to perform optical switching on the data packet; or if the conflict data packet exists, it is determined, according to the priority information of the data packet, whether a priority of the data packet is higher than priorities of all conflict data packets, and if the priority of the data packet is higher than the priorities of all the conflict data packets, it is determined to perform optical switching on the data packet. The "optical switching unit" herein may be an optical switching unit that is integrated in the data scheduling apparatus provided in this embodiment of the present invention, or may be an optical switching unit provided in another apparatus.

In the foregoing two or other alternative implementation manners, the control unit 103 may be specifically configured to: implement control of optical switching on the data packet according to the routing information of the data packet if it is determined to perform optical switching on the data packet; or implement control of electrical switching on the data packet according to the routing information of the data packet if it is determined to perform electrical switching on the data packet.

Further, the determining unit 102 is further configured to: if the determined output port that is of the optical switching unit and corresponding to the data packet is idle, a conflict data packet exists, and the priority of the data packet is lower than or equal to a priority of any conflict data packet, determine that electrical switching is to be performed on the data packet.

If it is determined to perform optical switching on the data packet, the control unit 103 is further specifically configured to: extract a data frame from the data packet, encapsulate the data frame into an optical packet, and implement control of optical switching on the optical packet according to the control information.

In an implementation manner, the optical packet includes a preamble, a frame start flag, the data frame, and a frame end flag, and a length of the preamble is greater than or equal to a quantity of bits that need to be consumed by status adjustment performed by a receiver of the optical packet in order to correctly receive the optical packet. Further, the control unit 103 is further configured to: before implementing control of optical switching on a next optical packet of the current optical packet, set a first guard interval after the frame end flag of the current optical packet and before a preamble of the next optical packet, where duration of the first guard interval is greater than or equal to a time for performing status adjustment by the optical switching unit before optical switching is performed on the next optical packet.

In another implementation manner, the control unit 103 is specifically configured to: extract the data frame from the data packet (that is, a current data packet), determine whether an output port that is of the optical switching unit and corresponding to the data frame in the data packet is consistent with an output port that is of the optical switching unit and corresponding to a data frame in a previous data packet (that is, a data packet preceding the current data packet) of the data packet, and if they are consistent, encapsulate the data frame in the data packet into the optical packet, where the optical packet includes a frame start flag, the data frame in the data packet, and a frame end flag; and implement, according to the control information of the data packet, control of optical switching on the optical packet encapsulated from the data frame in the data packet.

Further, before implementing, according to the control information of the data packet, control of optical switching on the optical packet encapsulated from the data frame in the data packet, the control unit 103 sets a second guard interval after a frame end flag of an optical packet encapsulated from the data frame in the previous data packet of the data packet and before the frame start flag of the optical packet encapsulated from the data frame in the data packet. Preferably, duration of the second guard interval is less than a time for performing status adjustment by the optical switching unit before optical switching is performed on the optical packet encapsulated from the data frame in the current data packet.

It can be seen that in the data scheduling apparatus provided in this embodiment of the present invention, a data packet is received, and it is determined, according to control information carried in the data packet, whether to perform optical switching or perform electrical switching on the data packet; control of optical switching on the data packet is implemented according to the control information if it is determined to perform optical switching on the data packet; or control of electrical switching on the data packet is implemented according to the control information if it is determined to perform electrical switching on the data packet, which implements an effective combination of an electrical switching technology and an optical switching technology. The data packet may be switched by using an electrical switching unit or may be switched by using an optical switching unit, thereby effectively improving efficiency of data switching and better scheduling an optical switching resource and an electrical switching resource in a comprehensive manner.

Figure 17:
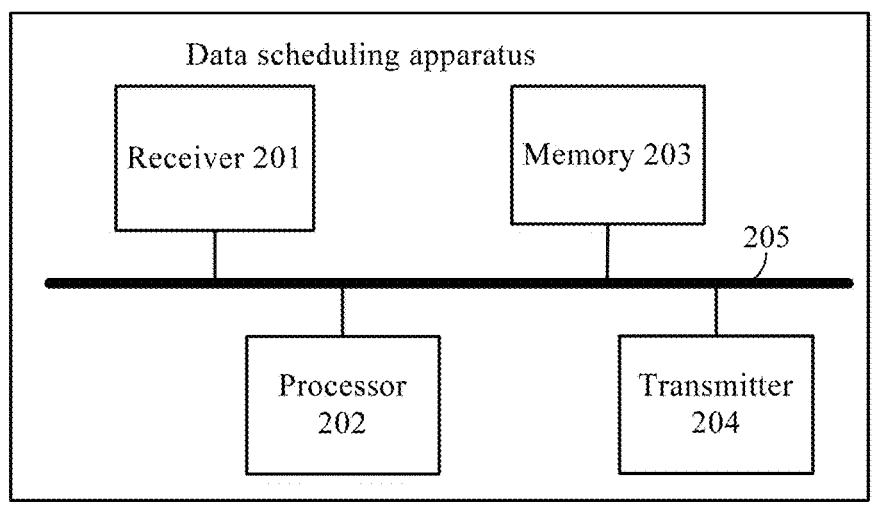
FIG. 17 is a schematic structural diagram of another data scheduling apparatus according to an embodiment of the present invention.

FIG. 17 is a schematic structural diagram of another data scheduling apparatus according to an embodiment of the present invention. The apparatus may be implemented as one or more general computer systems. The data scheduling apparatus includes a receiver 201, a processor 202, a memory 203, and a transmitter 204, and the four are connected by using a bus 205. The receiver 201 is configured to receive a data packet, where the data packet carries control information. The memory 203 is configured to store a computer program. The processor 202 is configured to read the computer program in the memory 203, and execute the following operations: determining, according to the control information carried in the data packet, whether to perform optical switching or perform electrical switching on the data packet; implementing control of optical switching on the data packet according to the control information if it is determined to perform optical switching on the data packet; or implementing control of electrical switching on the data packet according to the control information if it is determined to perform electrical switching on the data packet.

Further, the data scheduling apparatus may further be integrated with one or two of: an electrical switching unit and an optical switching unit. If the data scheduling apparatus is not integrated with the electrical switching unit or the optical switching unit, the transmitter 204 may be configured to send the data packet to the electrical switching unit or the optical switching unit according to a result determined by the processor 202. If the data scheduling apparatus is integrated with the electrical switching unit and/or the optical switching unit, the transmitter 204 may be configured to send, to another network device, a data packet obtained after the switching returned by the electrical switching unit and/or the optical switching unit.

In an implementation manner, the control information includes routing information of the data packet and a packet length of the data packet, and the processor 202 may specifically execute the following steps: if the packet length of the data packet is greater than or equal to a packet length threshold, determining to perform optical switching on the data packet, or if the packet length of the data packet is less than a packet length threshold, determining to perform electrical switching on the data packet; and implementing control of optical switching on the data packet according to the routing information of the data packet if it is determined to perform optical switching on the data packet, or implementing control of electrical switching on the data packet according to the routing information of the data packet if it is determined to perform electrical switching on the data packet.

In another implementation manner, the control information includes routing information of the data packet and priority information of the data packet, and the processor 202 may specifically execute the following steps: determining an output port that is of the optical switching unit and corresponding to a destination address carried in the routing information of the data packet, where the optical switching unit is configured to perform optical switching on the data packet; and if the determined output port that is of the optical switching unit and corresponding to the data packet is non-idle, determining to perform electrical switching on the data packet; or if the determined output port that is of the optical switching unit and corresponding to the data packet is idle, determining whether a conflict data packet currently exists, where an input port that is of the optical switching unit and corresponding to the conflict data packet is different from an input port that is of the optical switching unit and corresponding to the data packet, an output port that is of the optical switching unit and corresponding to the conflict data packet is the same as the output port that is of the optical switching unit and corresponding to the data packet, and the input port that is of the optical switching unit and corresponding to the conflict data packet is an input port that is of the optical switching unit and corresponding to a source address in routing information of the conflict data packet; where if the conflict data packet does not exist, it is determined to perform optical switching on the data packet; or if a conflict data packet exists, it is determined, according to the priority information of the data packet, whether a priority of the data packet is higher than the priorities of all conflict data packets, and if the priority of the data packet is higher than the priorities of all the conflict data packets, it is determined to perform optical switching on the data packet; control of optical switching on the data packet is implemented according to the routing information of the data packet if it is determined to perform optical switching on the data packet, or control of electrical switching on the data packet is implemented according to the routing information of the data packet if it is determined to perform electrical switching on the data packet. Further, if the determined output port that is of the optical switching unit and corresponding to the data packet is idle, a conflict data packet exists, and the priority of the data packet is lower than or equal to a priority of any conflict data packet, it is determined to perform electrical switching on the data packet.

If it is determined to perform optical switching on the data packet, the processor 202 is further configured to: extract a data frame from the data packet, encapsulate the data frame into an optical packet, and implement control of optical switching on the optical packet according to the control information.

In an implementation manner, the optical packet includes a preamble, a frame start flag, the data frame, and a frame end flag, and a length of the preamble is greater than or equal to a quantity of bits that need to be consumed by status adjustment performed by a receiver of the optical packet in order to correctly receive the optical packet. The processor 202 is further configured to: before implementing control of optical switching on a next optical packet of the optical packet, set a first guard interval after the frame end flag of the optical packet and before a preamble of the next optical packet, where duration of the first guard interval is greater than or equal to a time for performing status adjustment by the optical switching unit before optical switching is performed on the next optical packet.

In another implementation manner, the processor 202 is specifically configured to: extract the data frame from the data packet, determine whether an output port that is of the optical switching unit and corresponding to the data frame in the data packet is consistent with an output port that is of the optical switching unit and corresponding to a data frame in a previous data packet of the data packet, and if they are consistent, encapsulate the data frame in the data packet into the optical packet, where the optical packet includes a frame start flag, the data frame in the data packet, and a frame end flag; and implement, according to the control information of the data packet, control of optical switching on the optical packet encapsulated from the data frame in the data packet.

Further, before control of optical switching on the optical packet encapsulated from the data frame in the data packet is implemented according to the control information of the data packet, a second guard interval is set after a frame end flag of an optical packet encapsulated from the data frame in the previous data packet and before the frame start flag of the optical packet encapsulated from the data frame in the data packet. Preferably, duration of the second guard interval is less than a time for performing status adjustment by the optical switching unit before optical switching is performed on the optical packet encapsulated from the data frame in the current data packet.

It can be seen that in the data scheduling apparatus provided in this embodiment of the present invention, a data packet is received, and it is determined, according to control information carried in the data packet, whether to perform optical switching or perform electrical switching on the data packet; control of optical switching on the data packet is implemented according to the control information if it is determined to perform optical switching on the data packet; or control of electrical switching on the data packet is implemented according to the control information if it is determined to perform electrical switching on the data packet, which implements an effective combination of an electrical switching technology and an optical switching technology. The data packet may be switched by using an electrical switching unit or may be switched by using an optical switching unit, thereby effectively improving efficiency of data switching and better scheduling an optical switching resource and an electrical switching resource in a comprehensive manner.

In conclusion, in the data scheduling and switching method, apparatus, and system provided in the embodiments of the present invention, an optical switching unit and an electrical switching unit are used, so that an optical switching resource and an electrical switching resource are better scheduled in a comprehensive manner, and a switching bottleneck of an electrical switching device is overcome. In addition, a control policy is provided, so that electrical switching and optical switching may be performed on a large number of data packets at the same time, which avoids, to an extent, a conflict problem arising in optical switching in addition to greatly improving a switching capacity and switching efficiency.

Further, an optical packet format provided in the embodiments of the present invention ensures that an optical packet obtained after optical switching can be correctly received by a burst receiver. In addition, a data flow formed by optical packets that are sent to a same port is further provided, thereby improving efficiency of line utilization.

It should be noted that, the "connection" in the embodiments of the present invention means that there is a communication connection between two or more than two virtual modules, two or more than two entity modules, or an entity module and a virtual module, and specific implementation of the connection may be one or more communications lines or signal lines. Unless otherwise specified, the "connection" may be a direct connection, may be a connection by using an interface or a port, or may be an indirect connection by using another virtual module or an entity module. In the embodiments of the present invention, the terms the "first" and the "second" are merely for ease of distinguishing and not intended to limit a specific sequence.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units or modules described as separate parts may or may not be physically separate, and parts displayed as units or modules may or may not be physical units, may be located in one position, or may be distributed on a plurality of network units. A part or all of the units or modules may be selected according to actual needs to achieve the objectives of the solutions of the embodiments. In addition, in the accompanying drawings of the apparatus embodiments provided by the present invention, connection relationships between units or modules indicate that the modules have communication connections with each other, which may be specifically implemented as one or more communications buses or signal cables. A person of ordinary skill in the art may understand and implement the embodiments of the present invention without creative efforts.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

By means of the description of the foregoing embodiments, a person skilled in the art may clearly understand that the present invention may be implemented by using computer software plus necessary universal hardware and by using hardware, including an integrated circuit, a universal CPU, a universal memory, a universal component, and the like, and certainly may also be implemented by using dedicated hardware such as a dedicated integrated circuit, a dedicated CPU, a dedicated memory, and a dedicated component. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data scheduling method, wherein the method comprises:
   receiving a data packet, wherein the data packet carries control information, wherein the control information comprises routing information of the data packet and a packet length of the data packet;
   determining, according to the packet length of the data packet, whether to perform optical switching or perform electrical switching on the data packet, wherein determining whether to perform the optical switching or perform the electrical switching on the data packet comprises determining to perform the optical switching on the data packet when the packet length of the data packet is greater than or equal to a packet length threshold, and determining to perform the electrical switching on the data packet when the packet length of the data packet is less than the packet length threshold;

implementing control of the optical switching on the data packet according to the routing information of the data packet when it is determined to perform the optical switching on the data packet; and implementing control of the electrical switching on the data packet according to the routing information of the data packet when it is determined to perform the electrical switching on the data packet.

2. The method according to claim 1, wherein the method further comprises sending a second data packet obtained after the optical switching or the electrical switching, wherein the optical switching and the electrical switching are completed under control implemented according to the routing information of the data packet.

3. A data scheduling apparatus, comprising:
a receiver;
a processor; and
a controller;
wherein the receiver is configured to receive a data packet, and to send the data packet to the processor;
wherein the processor is configured to:
receive the data packet sent by the receiver, wherein the data packet carries control information, wherein the control information comprises routing information of the data packet and a packet length of the data packet; and
determine, according to the packet length of the data packet, whether optical switching or electrical switching is to be performed on the data packet, wherein determining whether the optical switching or the electrical switching is to be performed on the data packet comprises determining that the optical switching is to be performed on the data packet when the packet length of the data packet is greater than or equal to a packet length threshold, and determining that the electrical switching is to be performed on the data packet when the packet length of the data packet is less than the packet length threshold; and
wherein the controller control unit is configured to:
implement control of the optical switching on the data packet according to the routing information of the data packet when the processor determines that the optical switching is to be performed on the data packet; and
implement control of the electrical switching on the data packet according to the routing information of the data packet when it is determined to perform the electrical switching on the data packet.

4. The apparatus according to claim 3, further comprising a transmitter, wherein the transmitter is configured to send a second data packet obtained after the optical switching or the electrical switching, and wherein the optical switching and the electrical switching are completed under control implemented by the controller according to the routing information of the data packet.

5. The apparatus according to claim 3, further comprising an electrical switch, configured to perform the electrical switching on the data packet, wherein the controller is configured to control, according to the routing information of the data packet, the electrical switch to perform the electrical switching on the data packet when it is determined to perform the electrical switching on the data packet.

6. The apparatus according to claim 3, further comprising an optical switch configured to perform the optical switching on the data packet, wherein the controller is configured to control, according to the routing information of the data packet, the optical switch to perform the optical switching on the data packet when it is determined to perform the optical switching on the data packet.

7. The apparatus according to claim 3, wherein the controller is configured to extract a data frame from the data packet, to encapsulate the data frame into an optical packet, and to implement control of the optical switching on the optical packet according to the routing information of the data packet, when it is determined to perform the optical switching on the data packet.

8. A data switching apparatus, the data switching apparatus comprising:
a plurality of first input ports;
a plurality of first output ports;
a data packet distribution and scheduling unit; and
an electrical switching unit;
wherein the data packet distribution and scheduling unit is connected to a first input port of the data switching apparatus and is configured to receive a data packet through the first input port of the data switching apparatus, wherein the data packet carries control information, and the data packet distribution and scheduling unit is further configured to determine, according to the control information, whether optical switching or electrical switching is to be performed on the data packet, and wherein the data packet distribution and scheduling unit is further connected to a second input port of the electrical switching unit, so as to send, to the electrical switching unit, the data packet on which electrical switching is determined to be performed;
wherein the electrical switching unit is configured to perform the electrical switching on the data packet sent by the data packet distribution and scheduling unit, the electrical switching unit comprising a plurality of second input ports, configured to receive the data packet sent by the data packet distribution and scheduling unit, and a plurality of second output ports connected to the data packet distribution and scheduling unit, and is configured to send a data packet obtained after the electrical switching to the data packet distribution and scheduling unit; and
wherein the data packet distribution and scheduling unit is further connected to a first output port of the data switching apparatus, and is configured to receive the data packet that is obtained after the electrical switching and sent by the electrical switching unit, and to send, through the connected first output port of the data switching apparatus, the data packet obtained after the electrical switching.

9. The apparatus according to claim 8, the apparatus further comprising an optical switching unit, wherein:
the data packet distribution and scheduling unit is further connected to a third input port of the optical switching unit, so as to send, to the optical switching unit, the data packet on which the optical switching is determined to be performed;
the optical switching unit is configured to perform the optical switching on the data packet sent by the data packet distribution and scheduling unit, the optical switching unit comprising a plurality of third input ports, configured to receive the data packet sent by the data packet distribution and scheduling unit, and a plurality of third output ports connected to the data packet distribution and scheduling unit and configured to send a data packet obtained after the optical switching to the data packet distribution and scheduling unit; and the data packet distribution and scheduling unit is further configured to receive the data packet that is obtained after the optical switching and sent by the optical switching unit, and send the data packet obtained after the optical switching through the connected first output port of the data switching apparatus.

10. The apparatus according to claim 9, wherein the apparatus further comprises:
a plurality of data packet distribution modules;
a central control scheduling module; and
a plurality of data packet sending modules;
wherein each data packet distribution module is connected to one first input port of the data switching apparatus so as to receive a respective data packet through the connected first input port of the data switching apparatus, extract respective control information of the respective data packet from the respective data packet, and send the respective control information to the central control scheduling module;
wherein the central control scheduling module is configured to:
for each data packet distribution module, receive the respective control information that is of the respective data packet and sent by the respective data packet distribution module, determine, according to the respective control information, respective distribution information corresponding to the respective data packet, and send the respective distribution information to the respective data packet distribution module, wherein the respective distribution information is used to indicate whether the respective data packet is to be switched by the optical switching unit or is to be switched by the electrical switching unit; and
control, according to the control information of the respective data packet, the optical switching unit or the electrical switching unit to perform switching on the respective data packet;
wherein each data packet distribution module is further connected to one third input port of the optical switching unit and one second input port of the electrical switching unit, each data packet distribution module is configured to receive the respective distribution information that is of the respective data packet and sent by the central control scheduling module, and determine, according to the respective distribution information, whether to send the respective data packet to the optical switching unit or send the respective data packet to the electrical switching unit;
wherein when the respective distribution information indicates that the respective data packet is to be switched by the optical switching unit, each data packet distribution module is configured to convert the respective data packet into a respective optical packet and send the respective optical packet to the optical switching unit through the connected third input port of the optical switching unit, so that the optical switching unit performs the optical switching on the respective optical packet under control implemented by the central control scheduling module according to control information of the respective optical packet, and sends, through a third output port of the optical switching unit, a respective optical packet obtained after the optical switching to a respective data packet sending module connected to the third output port;

wherein when the respective distribution information indicates that the respective data packet is to be switched by the electrical switching unit, send the respective data packet to the electrical switching unit through the connected second input port of the electrical switching unit, so that the electrical switching unit performs the electrical switching on the respective data packet under control implemented by the central control scheduling module according to the control information of the respective data packet, and sends, through a second output port of the electrical switching unit, the respective data packet obtained after the electrical switching to a respective data packet sending module connected to the second output port; and wherein the each data packet sending module is connected to one third output port of the optical switching unit and one second output port of the electrical switching unit so as to receive, through the connected third output port of the optical switching unit, a respective data packet sent by the optical switching unit, or receive, through the connected second output port of the electrical switching unit, a respective data packet sent by the electrical switching unit, each data packet sending module is further connected to one first output port of the data switching apparatus so as to send, through the connected first output port of the data switching apparatus, the respective data packet obtained after the optical switching or the data packet obtained after the electrical switching.

11. The apparatus according to claim 10, wherein the control information of the respective data packet comprises routing information of the respective data packet and a packet length of the respective data packet; and
the central control scheduling module is specifically configured to:
for each data packet distribution module, receive the routing information of the respective data packet and the packet length of the respective data packet that are sent by the respective data packet distribution module;
when the packet length of the respective data packet is greater than or equal to a packet length threshold, determine that the respective distribution information corresponding to the respective data packet indicates that the respective data packet is to be switched by the optical switching unit; or
when the packet length of the respective data packet is less than a packet length threshold, determine that the respective distribution information corresponding to the respective data packet indicates that the data packet is to be switched by the electrical switching unit;
send the respective distribution information to the respective data packet distribution module; and
control, according to the routing information of the respective data packet, the optical switching unit or the electrical switching unit to perform switching on the respective data packet.

12. The apparatus according to claim 10, wherein the control information of the respective data packet comprises routing information of the respective data packet and priority information of the respective data packet; and
wherein the central control scheduling module is configured to:

for each data packet distribution module, receive the routing information of the respective data packet and the priority information of the respective data packet that are sent by the respective data packet distribution module;

determine a first output port of the data switching apparatus corresponding to a destination address carried in the routing information, and determine, according to the determined first output port of the data switching apparatus, a third output port that is of the optical switching unit and connected, through the respective data packet sending module, to the first output port of the data switching apparatus; and when the determined third output port of the optical switching unit corresponding to the respective data packet is non-idle, determine that the respective distribution information of the respective data packet indicates that the respective data packet is to be switched by the electrical switching unit; or when the determined third output port of the optical switching unit corresponding to the respective data packet is idle, determine whether a conflict data packet currently exists, wherein a third input port of the optical switching unit corresponding to the conflict data packet is different from a third input port of the optical switching unit corresponding to the respective data packet, a third output port of the optical switching unit corresponding to the conflict data packet is the same as the third output port of the optical switching unit corresponding to the respective data packet, the third input port of the optical switching unit corresponding to the conflict data packet is a third input port of the optical switching unit connected to a first input port of the data switching apparatus corresponding to a source address in routing information of the conflict data packet, and the first input port of the data switching apparatus is connected to the third input port of the optical switching unit through the respective data packet distribution module;

wherein when no conflict data packet exists, determine that the respective distribution information of the respective data packet indicates that the respective data packet is to be switched by the optical switching unit; or wherein when a conflict data packet exists, determine, according to the priority information of the respective data packet, whether a priority of the respective data packet is higher than priorities of all conflict data packets, and when the priority of the respective data packet is higher than the priorities of all the conflict data packets, determine that the respective distribution information of the respective data packet indicates that the respective data packet is to be switched by the optical switching unit; and control, according to the routing information of the respective data packet, the optical switching unit or the electrical switching unit to perform switching on the respective data packet.

13. The apparatus according to claim 12, wherein the central control scheduling module is further specifically configured to determine that the respective distribution information of the respective data packet indicates that the respective data packet is to be switched by the electrical switching unit when the determined third output port of the optical switching unit corresponding to the respective data packet is idle, when a conflict data packet exists, and when the priority of the respective data packet is lower than or equal to a priority of any conflict data packet.

14. The apparatus according to claim 10, wherein each respective data packet distribution module specifically comprises:

a respective data packet receiving and processing submodule;

a respective first storage submodule; and a respective optical packet encapsulation submodule;

wherein the respective data packet receiving and processing submodule is connected to the first input port of the data switching apparatus so as to receive a respective data packet through the connected first input port of the data switching apparatus, parse out a respective data frame from the respective data packet, extract respective control information of the respective data packet from the respective data frame, send the respective control information to the central control scheduling module, and store the respective data frame in the respective first storage submodule;

wherein the central control scheduling module is specifically configured to:

for each data packet distribution module, receive the respective control information that is of the respective data packet and sent by the respective data packet receiving and processing submodule, and determine the respective distribution information of the respective data packet according to the respective control information; and instruct the respective first storage submodule to send the respective stored data frame of the respective data packet to the optical packet encapsulation submodule of the respective data packet distribution module when the respective distribution information indicates that the respective data packet is to be switched by the optical switching unit; and wherein the respective optical packet encapsulation submodule is connected to a third input port of the optical switching unit, and the respective optical packet encapsulation submodule is configured to:

encapsulate the respective data frame received from the respective first storage submodule into a respective optical packet; and send the respective optical packet to the optical switching unit through the connected third input port of the optical switching unit.

15. The apparatus according to claim 10, wherein each respective data packet sending module specifically comprises:

a respective optical packet receiving and processing submodule;

a respective second storage submodule; and a respective data packet sending and processing submodule;

wherein the respective optical packet receiving and processing submodule is connected to a third output port of the optical switching unit so as to receive a respective optical packet through the connected third output port of the optical switching unit, perform status adjustment processing on optical packets from different third input ports of the optical switching unit, parse out a data frame from each optical packet, and store the data frame parsed out from each optical packet in the respective second storage submodule; and wherein the data packet sending and processing submodule is connected to the first output port of the data switching apparatus, and configured to acquire the data frame parsed out from each optical packet stored in the respective second storage submodule, encapsulate the data frame parsed out from each optical packet into a data packet, and send the data packet through the connected first output port of the data switching apparatus.

16. A data scheduling method, comprising:
receiving a data packet, wherein the data packet carries control information, wherein the control information comprises routing information of the data packet and a priority information of the data packet;
determining whether to perform optical switching or perform electrical switching on the data packet;
implementing control of the optical switching on the data packet according to the routing information of the data packet when it is determined to perform the optical switching on the data packet; and
implementing control of the electrical switching on the data packet according to the routing information of the data packet when it is determined to perform the electrical switching on the data packet;
wherein determining whether to perform the optical switching or perform the electrical switching on the data packet comprises:
determining an output port of an optical switching unit corresponding to a destination address carried in the routing information of the data packet, wherein the optical switching unit is configured to perform the optical switching on the data packet;
when the determined output port of the optical switching unit corresponding to the destination address carried in the routing information of the data packet is non-idle, determining to perform the electrical switching on the data packet;
when the determined output port of the optical switching unit corresponding to the destination address carried in the routing information of the data packet is idle, determining whether a conflict data packet exists, wherein an input port of an optical switching unit corresponding to the conflict data packet is different from an input port of the optical switching unit corresponding to the destination address carried in the routing information of the data packet, an output port of the optical switching unit corresponding to the conflict data packet is the same as the output port of the optical switching unit corresponding to the destination address carried in the routing information of the data packet, and the input port of the optical switching unit corresponding to the conflict data packet is an input port of the optical switching unit corresponding to a source address in routing information of the conflict data packet;
when the conflict data packet does not exist, determining to perform the optical switching on the data packet; and
when the conflict data packet exists, determining, according to the priority information of the data packet, whether a priority of the data packet is higher than priorities of all conflict data packets, and when the priority of the data packet is higher than the priorities of all the conflict data packets, determining to perform the optical switching on the data packet.

17. The method according to claim 16, wherein determining whether to perform the optical switching or perform the electrical switching on the data packet further comprises determining to perform the electrical switching on the data packet when the determined output port of the optical switching unit corresponding to the destination address carried in the routing information of the data packet is idle, when the conflict data packet exists, and when the priority of the data packet is lower than or equal to a priority of any conflict data packet.

18. The method according to claim 17, wherein when it is determined to perform optical switching on the data packet, the method further comprises extracting a data frame from the data packet, and encapsulating the data frame into an optical packet, wherein implementing control of the optical switching on the data packet according to the routing information of the data packet comprises implementing control of the optical switching on the optical packet according to the routing information of the data packet.

19. A data scheduling apparatus, comprising:
a receiver;
a processor;
a first optical switch; and
a controller;
wherein the receiver is configured to receive a data packet, and to send the data packet to the processor;
wherein the processor is configured to:
receive the data packet sent by the receiver, wherein the data packet carries control information, wherein the control information comprises routing information of the data packet and a priority information of the data packet; and
determine, according to the priority information of the data packet, whether optical switching or electrical switching is to be performed on the data packet; and
wherein the controller is configured to:
implement control of the optical switching on the data packet according to the routing information of the data packet when the processor determines that the optical switching is to be performed on the data packet;
implement control of the electrical switching on the data packet according to the routing information of the data packet when it is determined to perform the electrical switching on the data packet; and
determine an output port of an optical switch corresponding to a destination address carried in the routing information of the data packet;
wherein the first optical switch is configured to perform the optical switching on the data packet;
wherein the processor is configured to determine that the electrical switching is to be performed on the data packet when the determined output port of the optical switch corresponding to the destination address carried in the routing information of the data packet is non-idle;
wherein the processor is configured to determine whether a conflict data packet currently exists when the determined output port of the optical switch corresponding to the destination address carried in the routing information of the data packet is idle;
wherein an input port of an optical switch corresponding to the conflict data packet is different from an input port of the optical switch corresponding to the destination address carried in the routing information of the data packet, an output port of the optical switch corresponding to the conflict data packet is the same as the output port of the optical switch corresponding to the destination address carried in the routing information of the data packet, and the input port of the optical switch corresponding to the conflict data packet is an input port of an optical switch corresponding to a source address in routing information of the conflict data packet; and wherein the processor is configured to, when no conflict data packet exists, determine to perform the optical switching on the data packet, and when a conflict data packet exists, determine, according to the priority information of the data packet, whether a priority of the data packet is higher than priorities of all conflict data packets, and when the priority of the data packet is higher than the priorities of all the conflict data packets, determine to perform the optical switching on the data packet.

20. The apparatus according to claim 19, wherein the processor is further configured to determine that the electrical switching is to be performed on the data packet when the determined output port of the optical switch corresponding to the destination address carried in the routing information of the data packet is idle, when a conflict data packet exists, and when the priority of the data packet is lower than or equal to a priority of any conflict data packet.

* * * * *

UNITED STATES PATENT AND TRADEMARK OFFICE
CERTIFICATE OF CORRECTION

PATENT NO.         : 10,313,768 B2
APPLICATION NO.    : 14/874358
DATED              : June 4, 2019
INVENTOR(S)        : Xiaoling Yang Page 1 of 1

It is certified that error appears in the above-identified patent and that said Letters Patent is hereby corrected as shown below:

In the Claims

Column 43, Line 44, Claim 3, delete "wherein the controller control unit is configured to" and insert --wherein the controller is configured to--.

Signed and Sealed this
Sixth Day of August, 2019

Andrei Iancu
*Director of the United States Patent and Trademark Office*